United States Patent
Okamoto et al.

(10) Patent No.: US 12,468,012 B2
(45) Date of Patent: Nov. 11, 2025

(54) RADAR DEVICE

(71) Applicant: Mitsubishi Electric Corporation, Tokyo (JP)

(72) Inventors: Kazuhisa Okamoto, Tokyo (JP); Yasuhide Nonaka, Tokyo (JP); Fuyuki Fukushima, Tokyo (JP); Kentaro Isoda, Tokyo (JP); Kei Suwa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 317 days.

(21) Appl. No.: 18/229,251

(22) Filed: Aug. 2, 2023

(65) Prior Publication Data
US 2024/0012104 A1  Jan. 11, 2024

Related U.S. Application Data

(63) Continuation of application No. PCT/JP2021/010368, filed on Mar. 15, 2021.

(51) Int. Cl.
| | | |
|---|---|---|
| *G01S 7/292* | (2006.01) | |
| *G01S 7/282* | (2006.01) | |
| *G01S 7/288* | (2006.01) | |
| *G01S 13/58* | (2006.01) | |

(52) U.S. Cl.
CPC .............. *G01S 7/292* (2013.01); *G01S 7/282* (2013.01); *G01S 7/288* (2013.01); *G01S 13/582* (2013.01)

(58) Field of Classification Search
CPC .......... G01S 7/292; G01S 7/282; G01S 7/288; G01S 13/582
See application file for complete search history.

(56) References Cited

U.S. PATENT DOCUMENTS

| | | | |
|---|---|---|---|
| 5,079,556 A | * | 1/1992 | Itoh .......................... G01S 13/20 342/134 |
| 6,078,281 A | | 6/2000 | Milkovich et al. |
| 2005/0104765 A1 | * | 5/2005 | Bandhauer .............. G01S 13/87 342/159 |
| 2016/0091599 A1 | * | 3/2016 | Jenkins ................. G01S 13/931 342/165 |

(Continued)

FOREIGN PATENT DOCUMENTS

| | | |
|---|---|---|
| EP | 3 306 342 A1 | 4/2018 |
| JP | 3-36984 U | 4/1991 |

(Continued)

OTHER PUBLICATIONS

International Search Report (PCT/ISA/210), issued in PCT/JP2021/010368, dated May 11, 2021.

(Continued)

*Primary Examiner* — William Kelleher
*Assistant Examiner* — Hailey R Le
(74) *Attorney, Agent, or Firm* — Birch, Stewart, Kolasch & Birch, LLP

(57) ABSTRACT

While transmitting any one transmission signal of a plurality of transmission signals, a transmitting-receiving unit in a radar device acquires, as a reception signal for target detection, a reception signal of a frequency band different from a frequency band of the transmission signal, and blocks a reception signal of the same frequency band as the frequency band of the transmission signal.

1 Claim, 13 Drawing Sheets

(56) References Cited

U.S. PATENT DOCUMENTS

2019/0103645 A1* 4/2019 Guyette .................. H03H 7/12
2019/0181832 A1* 6/2019 Schmalzl ................. H04B 1/50

FOREIGN PATENT DOCUMENTS

| JP | 3-144390 A | 6/1991 |
| JP | 6-317653 A | 11/1994 |
| JP | 2002-82162 A | 3/2002 |
| JP | 2007-155210 A | 6/2007 |
| JP | 2010-175457 A | 8/2010 |
| JP | 2014-182010 A | 9/2014 |
| JP | 2015-212655 A | 11/2015 |
| WO | WO 99/31525 | 6/1999 |
| WO | WO 2016/194044 A1 | 12/2016 |
| WO | WO 2020/003459 A1 | 1/2020 |

OTHER PUBLICATIONS

Great Britain Office Action for Great Britain Application No. GB2313317.6, dated Oct. 26, 2023.

* cited by examiner

RADAR DEVICE

CROSS REFERENCE TO RELATED APPLICATIONS

This application is a Continuation of PCT International Application No. PCT/JP2021/010368, filed on Mar. 15, 2021, which is hereby expressly incorporated by reference into the present application.

TECHNICAL FIELD

The present disclosure relates to a radar device.

BACKGROUND ART

A radar device acquires a reception signal by transmitting a transmission signal to a target and receiving a reflection signal reflected by the target.

For example, Patent Literature 1 describes a radar device that measures a distance to a target and a speed of the target. The radar device generates a transmission signal by performing encoding modulation on a pulse train, transmits the generated transmission signal to the target, and acquires an encoded pulse train by receiving a reflection signal reflected by the target.

CITATION LIST

Patent Literature

Patent Literature 1: JP 2014-182010 A

SUMMARY OF INVENTION

Technical Problem

In the conventional technique as described above, since the reflection signal reflected from the target cannot be received while the transmission signal is transmitted, there is a problem that an eclipse (lack of the reception signal) occurs in the acquired reception signal. For example, in a case where the transmission signal is a pulse wave, it is necessary to limit the transmission pulse width in order to reduce the eclipse, and it is difficult to sufficiently increase transmission power depending on a coherent processing interval (CPI).

The present disclosure has been made to solve the above problems, and an object thereof is to provide a technology for reducing an eclipse.

Solution to Problem

A radar device according to the present disclosure includes transmitting-receiving circuitry to transmit a plurality of transmission signals each of which is a pulse wave having different frequency band to a target at respective different timings and acquire a reception signal by receiving a reflection signal reflected from the target, and target detecting circuitry that detects the target on the basis of the reception signal acquired by the transmitting-receiving circuitry, in which while transmitting any one transmission signal out of the plurality of transmission signals, the transmitting-receiving circuitry acquires, as a reception signal for target detection, a reception signal of a frequency band different from a frequency band of the transmission signal, and blocks a reception signal of the same frequency band as the frequency band of the transmission signal, and the target detecting circuitry includes: a mixer to down-convert the reception signal for target detection acquired by the transmitting-receiving circuitry; an analog-to-digital converter to convert the reception signal for target detection down-converted by the mixer from an analog signal into a digital signal; range Doppler processing circuitry to calculate a range Doppler signal indicating a speed of the target and a distance to the target on a basis of the reception signal for target detection converted into a digital signal by the analog-to-digital converter; and target determination processing circuitry to determine presence or absence of a target on a basis of the range Doppler signal calculated by the range Doppler processing circuitry, and the target detecting circuitry detects the target on the basis of the reception signal for target detection acquired by the transmitting-receiving circuitry, and the range Doppler processing circuitry corrects a phase rotation within a pulse caused by movement of the target and a phase rotation determined by a distance to the target and a difference between transmission frequencies in the reception signal for target detection converted into a digital signal by the analog-to-digital converter, and calculates the range Doppler signal by performing coherent integration on the corrected reception signal for target detection.

Advantageous Effects of Invention

According to the present disclosure, it is possible to reduce an eclipse.

DESCRIPTION OF EMBODIMENTS

Figure 9:
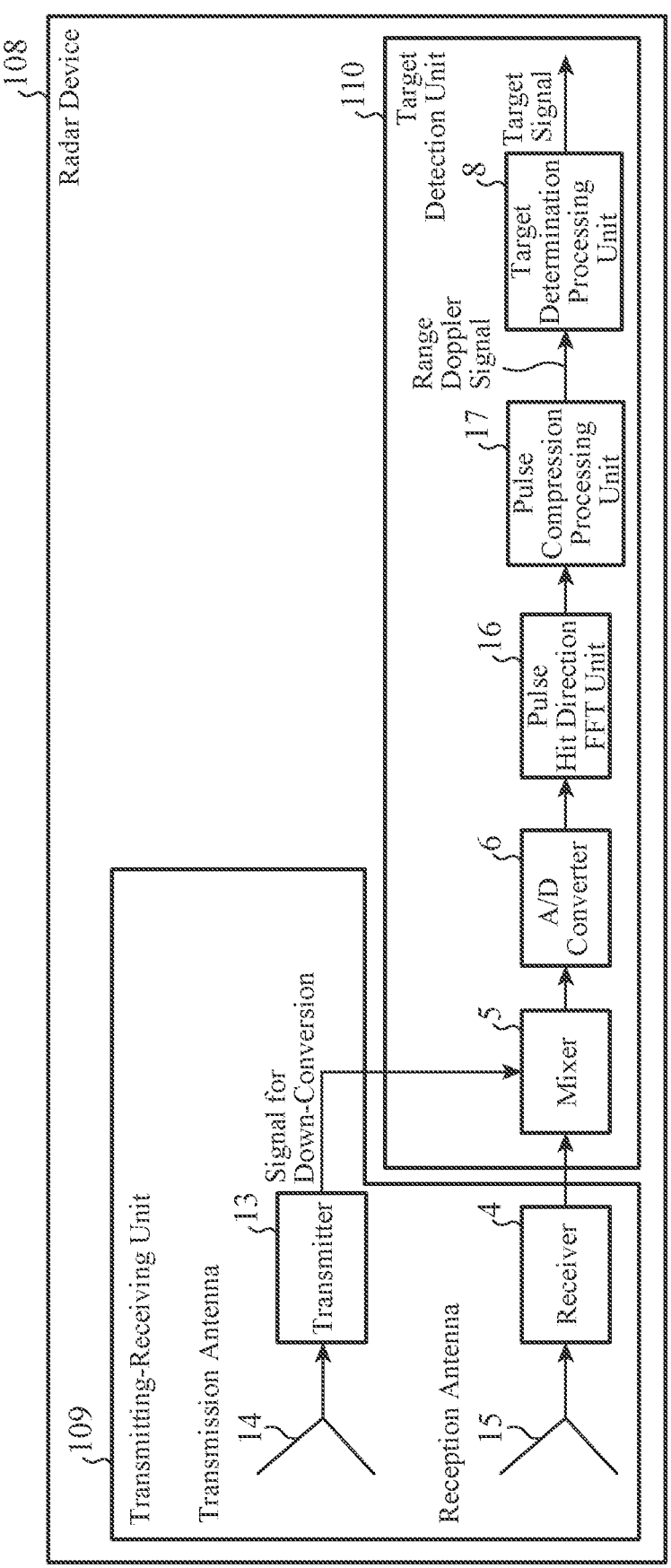
FIG. 9 is a block diagram illustrating a configuration of a radar device for explaining technical content as a premise of the radar device according to the first embodiment.

First, before describing a configuration of a radar device according to the first embodiment, technical content that are a premise of the radar device according to a first embodiment will be described. FIG. 9 is a block diagram illustrating a configuration of a radar device 108 for explaining technical content as a premise of the radar device according to the first embodiment. As illustrated in FIG. 9, the radar device 108 includes a transmitting-receiving unit 109 (transmitting-receiving device) and a target detecting unit 110. The transmitting-receiving unit 109 includes a transmitter 13, a transmission antenna 14, a reception antenna 15, and a receiver 4. The target detecting unit 110 includes a mixer 5, an A/D converter 6, a pulse hit direction FFT unit 16, a pulse compression processing unit 17, and a target determination processing unit 8.

The transmitter 13 generates a transmission pulse signal at a pulse hit interval. The transmitter 13 outputs the generated transmission pulse signal to the transmission antenna 14. Further, the transmitter 13 outputs a signal for down-conversion to the mixer 5.

The transmission antenna 14 transmits the transmission pulse signal generated by the transmitter 13 to a target as a radio wave.

The reception antenna 15 acquires a reception pulse signal by receiving a reflection pulse signal obtained by the transmission pulse signal transmitted by the transmission antenna 14 to the target being reflected by the target. The reception antenna 15 outputs the acquired reception pulse signal to the receiver 4.

The receiver 4 performs band limitation and phase detection on the reception pulse signal acquired by the reception antenna 15. The receiver 4 outputs the reception pulse signal subjected to the band limitation and the phase detection to the mixer 5.

The mixer 5 performs frequency conversion on the reception pulse signal subjected to the band limitation and the phase detection by the receiver 4. At that time, the mixer 5 frequency-converts the reception pulse signal into a baseband using the signal for down-conversion output from the transmitter 13. The mixer 5 outputs the frequency-converted reception pulse signal to the A/D converter 6.

The A/D converter 6 converts the reception pulse signal subjected to the frequency conversion by the mixer 5 from an analog signal into a digital signal. The A/D converter 6 outputs the reception pulse signal converted into the digital signal to the pulse hit direction FFT unit 16.

The pulse hit direction FFT unit 16 extracts the reception pulse signal converted into the digital signal by the A/D converter 6 at the pulse hit interval, and generates a signal in a Doppler direction by fast Fourier transform (FFT). The signal in the Doppler direction generated by the pulse hit direction FFT unit 16 is output to the pulse compression processing unit 17.

The pulse compression processing unit 17 generates a signal in a range direction by correlating the signal in the Doppler direction generated by the pulse hit direction FFT unit 16 with the transmission pulse signal. The signal in the range direction has a range resolution determined from the transmission bandwidth as a unit. The pulse compression processing unit 17 outputs the generated signal in the range direction to the target determination processing unit 8.

The target determination processing unit 8 detects a target signal on the basis of the signal in the range direction generated by the pulse compression processing unit 17 and a threshold value (threshold). The threshold value is determined based on a false alarm probability of erroneously determining a noise as the target signal in two-dimensional data of the Doppler direction and the range direction.

Figure 10:
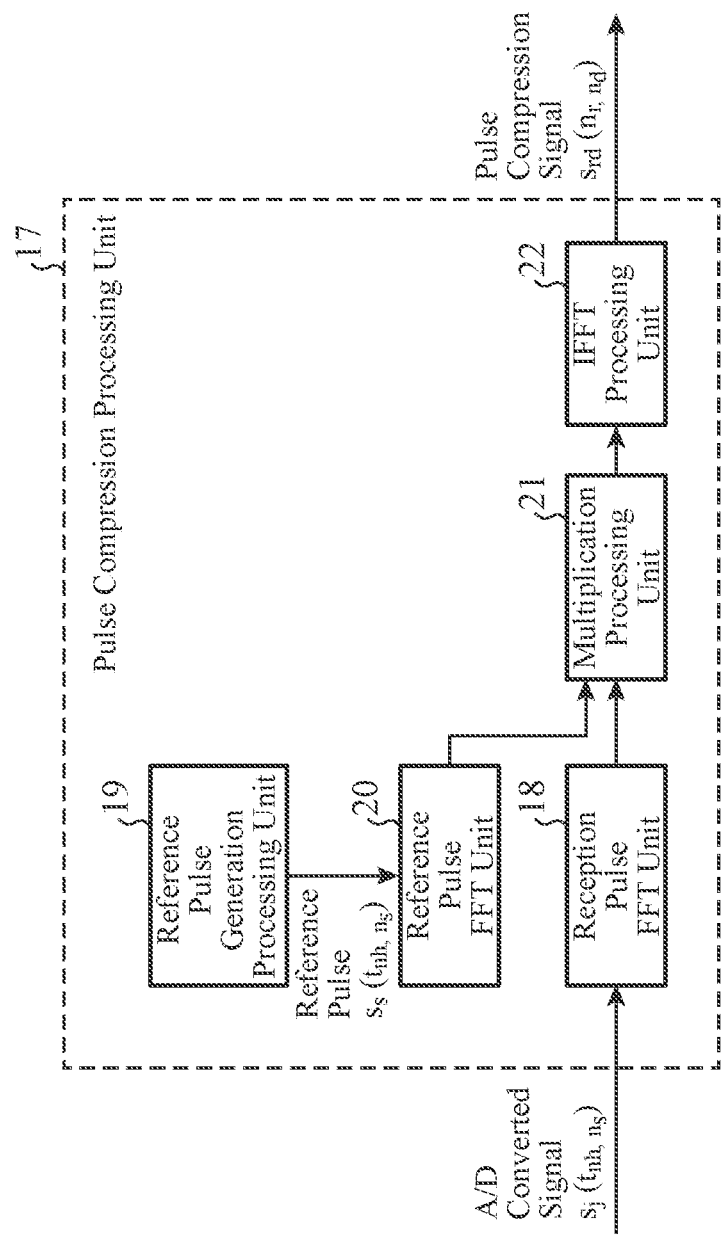
FIG. 10 is a block diagram illustrating a detailed configuration of a pulse compression processing unit of the radar device illustrated in FIG. 9.

FIG. 10 is a block diagram illustrating a detailed configuration of the pulse compression processing unit 17 of the radar device 108. As illustrated in FIG. 10, the pulse compression processing unit 17 includes a reception pulse FFT unit 18, a reference pulse generation processing unit 19, a reference pulse FFT unit 20, a multiplication processing unit 21, and an IFFT processing unit 22.

The reception pulse FFT unit 18 performs FFT processing (fast Fourier transform processing) on the signal in the Doppler direction generated by the pulse hit direction FFT unit 16. The reception pulse FFT unit 18 outputs the signal subjected to the FFT processing to the multiplication processing unit 21.

The reference pulse generation processing unit 19 generates a reference pulse to be used when pulse compression processing is performed. The reference pulse generation processing unit 19 outputs the generated reference pulse to the reference pulse FFT unit 20.

The reference pulse FFT unit 20 performs FFT processing (fast Fourier transform processing) on the A/D converted signal of the reference pulse generated by the reference pulse generation processing unit 19. The reference pulse FFT unit 20 outputs the signal subjected to the FFT processing to the multiplication processing unit 21.

The multiplication processing unit 21 multiplies the signal subjected to the FFT processing by the reception pulse FFT unit 18 and the signal subjected to the FFT processing by the reference pulse FFT unit 20. The multiplication processing unit 21 outputs the multiplied signal to the IFFT processing unit 22.

The IFFT processing unit 22 generates a pulse compression signal by performing inverse fast Fourier transform (IFFT) on the signal multiplied by the multiplication processing unit 21. The IFFT processing unit 22 outputs the generated pulse compression signal to the target determination processing unit 8.

Hereinafter, operation of the radar device 108 will be described. First, the transmitter 13 generates a transmission pulse signal, and the transmission antenna 14 transmits the transmission pulse signal generated by the transmitter 13 in a form of a radio wave to a target. Note that the transmission pulse signal has been subjected to modulation such as frequency modulation or code modulation, for example. The transmission pulse signal is repeatedly transmitted by the transmission antenna 14 at predetermined pulse hit intervals during a coherent processing interval (CPI).

The reception antenna 15 acquires the reception pulse signal by receiving the reflection pulse signal in which the transmission pulse signal is reflected by the target. The receiver 4 performs the band limitation and the phase detection on the reception pulse signal, and outputs the reception pulse signal subjected to the band limitation and the phase detection to the mixer 5.

The mixer 5 frequency-converts the reception pulse signal into the baseband using the signal for down-conversion from the transmitter 13. A signal (mixer output signal) subjected to frequency conversion by the mixer 5 is defined as $s_j(t)$. Note that t represents time. The mixer 5 outputs the mixer output signal $s_j(t)$ to the A/D converter 6.

The A/D converter 6 converts the mixer output signal $s_j(t)$ from an analog signal into a digital signal by sampling the mixer output signal $s_j(t)$ at predetermined time intervals.

Figure 11:
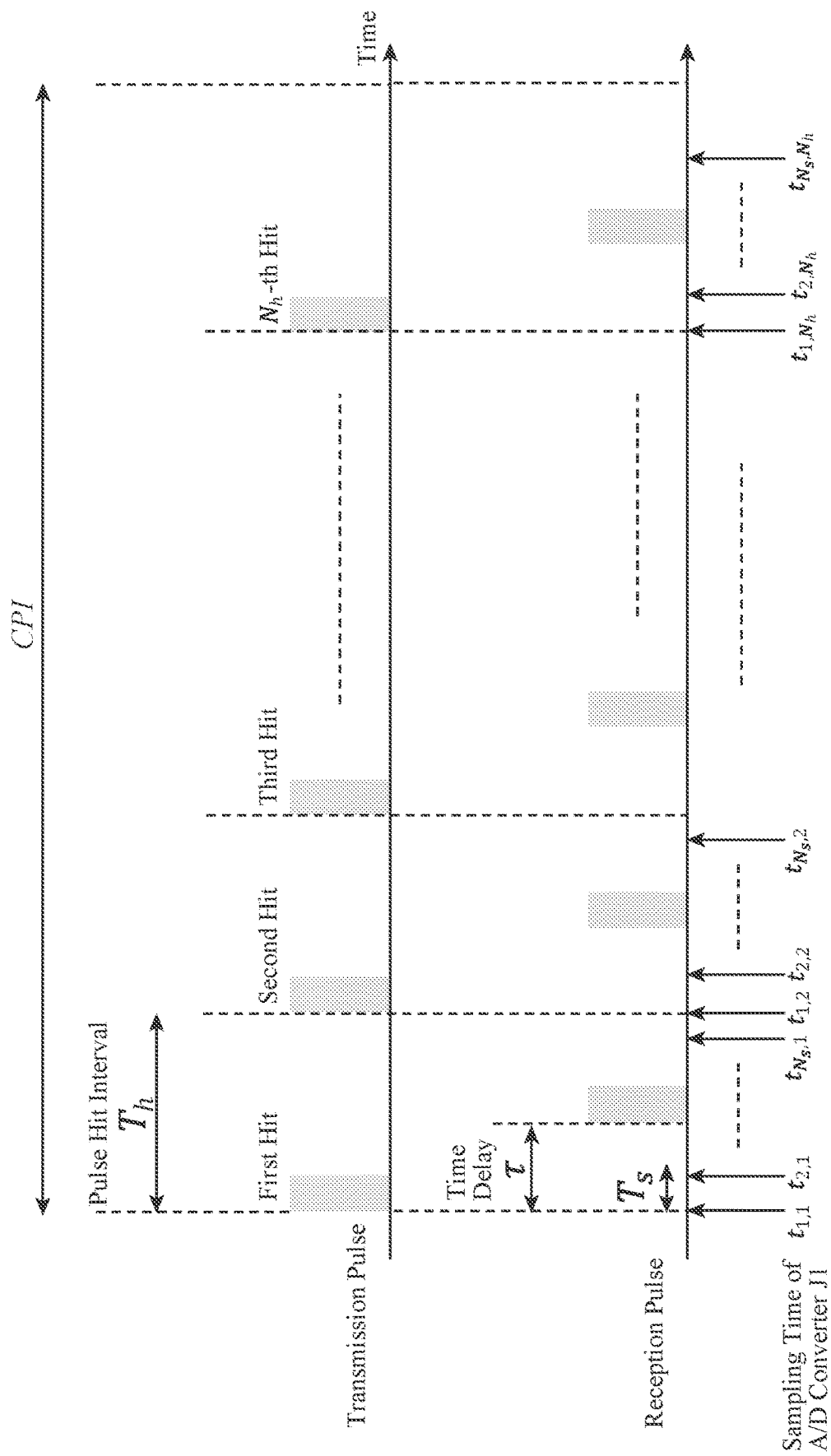
FIG. 11 is a graph illustrating sampling by an analog-to-digital converter.

FIG. 11 illustrates sampling by the A/D converter 6. As illustrated in FIG. 11, the transmission pulse signal is transmitted by $N_h$ hits during the CPI at a pulse hit interval $T_h$. The reception pulse signal reflected by the target has been received with a time delay τ. In each hit, $N_s$ point sampling is performed. With sampling times of $n_s(1 \leq n_s \leq N_s)$-th sampling time in an $n_h(1 \leq n_h \leq N_h)$ hit as $t_{ns, nh}$ (s and h indicated to the right of n are each a subscript of n), the A/D converter 6 outputs an A/D converted signal $s_j(t_{ns, nh})$. The A/D converter 6 outputs the A/D converted signal $s_j(t_{ns, nh})$ to the pulse hit direction FFT unit 16.

The pulse hit direction FFT unit 16 performs fast Fourier transform (FFT) processing on the A/D converted signal $s_j(t_{ns, nh})$ in the pulse hit direction. More specifically, the pulse hit direction FFT unit 16 generates pulse hit direction FFT signals $s_k(n_s, 1), s_k(n_s, 2), \ldots, s_k(n_s, N_d)$ by performing FFT processing on an A/D converted signals $s_j(t_{ns, 1}), \ldots, s_j(t_{ns, Nh})$ (hereinafter, h indicated to the right of N is a subscript of N). At this time, if necessary, the pulse hit direction FFT unit 16 generates the pulse hit direction FFT signal of the $N_d$ point by interpolation processing or the like in which zero is added to the pulse hit direction FFT signal and then FFT is performed.

The pulse hit direction FFT signals $s_j(n_s, 1), \ldots, s_j(n_s, N_d)$ represent the Doppler frequency of the signal sampled at the $n_s$-th sampling in each hit in units of Doppler bins. The size of one Doppler bin is determined from the CPI, the number of FFT points $N_d$, and the like. The pulse hit direction FFT unit 16 outputs the generated pulse hit direction FFT signal $s_k(n_s, n_d)$ $(1 \leq n_s \leq N_s, 1 \leq n_d \leq N_d)$ to the pulse compression processing unit 17.

The pulse compression processing unit 17 generates a range Doppler signal by performing the pulse compression processing on the pulse hit direction FFT signal.

The reception pulse FFT unit 18 of the pulse compression processing unit 17 generates reception pulse FFT output signals $s_{f2}(1, n_d), s_{f2}(2, n_d), \ldots, s_{f2}(N_r, n_d)$ by performing FFT processing on the pulse hit direction FFT signals $s_f(1, n_d), s_f(2, n_d), \ldots, s_f(N_s, n_d)$. Here, if necessary, the reception pulse FFT unit 18 generates a reception pulse FFT output signal for a $N_r$ point by interpolation processing or the like in which zero is added to the pulse hit direction FFT signal and then FFT processing is performed. The reception pulse FFT unit 18 outputs the generated reception pulse FFT output signal $s_{f2}(n_r, n_d)$ $(1 \leq n_r \leq N_r, 1 \leq n_d \leq N_d)$ to the multiplication processing unit 21.

The reference pulse generation processing unit 19 generates a reference pulse signal $s_s(t_{ns})$ $(1 \leq n_s \leq N_s)$ to be used for the pulse compression processing (s indicated to the right of n is a subscript of n). The reference pulse signal is assumed to be a reflection pulse signal from a target with a distance of zero, and a pulse signal obtained by frequency-converting a transmission pulse signal into the baseband can be used as the reference pulse signal. The reference pulse FFT unit 20 generates $s_{sf}(1), s_{sf}(2), \ldots, s_{sf}(N_r)$ by performing the FFT processing on the reference pulse $s_s(t_{ns})$ (s indicated to the right of n is a subscript of n). The reference pulse generation processing unit 19 outputs the generated FFT output signal for reference pulse $s_{sf}(n_r)$ $(1 \leq n_r \leq N_r)$ to the multiplication processing unit 21.

The multiplication processing unit 21 generates a multiplication signal $s_{sf2}(n_r, n_d)$ $(1 \leq n_h \leq N_h, 1 \leq n_s \leq N_s)$ by the following Expression (1).

$$s_{sf2}(n_r, n_d) = s_{f2}(n_r, n_d) s_{sf}^*(n_r) \tag{1}$$

In Expression (1), $s_{sf}^*(n_r)$ represents a complex conjugate of $s_{sf}(n_r)$. The multiplication processing unit 21 outputs the generated multiplication signal $s_{sf2}(n_r, n_d)$ to the IFFT processing unit 22.

The IFFT processing unit 22 generates a range Doppler signal $s_{rd}(n_r, n_d)$ by performing IFFT processing on the multiplication signals $s_{sf2}(1, n_d), s_{sf2}(2, n_d), \ldots, s_{sf2}(N_r, n_d)$. Here, $n_r$ represents a distance in units of range bins, and the size of one range bin is determined by a transmission frequency band, the number of FFT points $N_r$, or the like. The IFFT processing unit 22 transmits the generated range Doppler signal $s_{rd}(n_r, n_d)$ to the target determination processing unit 8.

The target determination processing unit 8 determines the presence or absence of a target by comparing the range Doppler signal $s_{rd}(n_r, n_d)$ with a threshold value (threshold). The threshold value is determined based on the false alarm probability of erroneously determining noise as the target signal.

Figure 12:
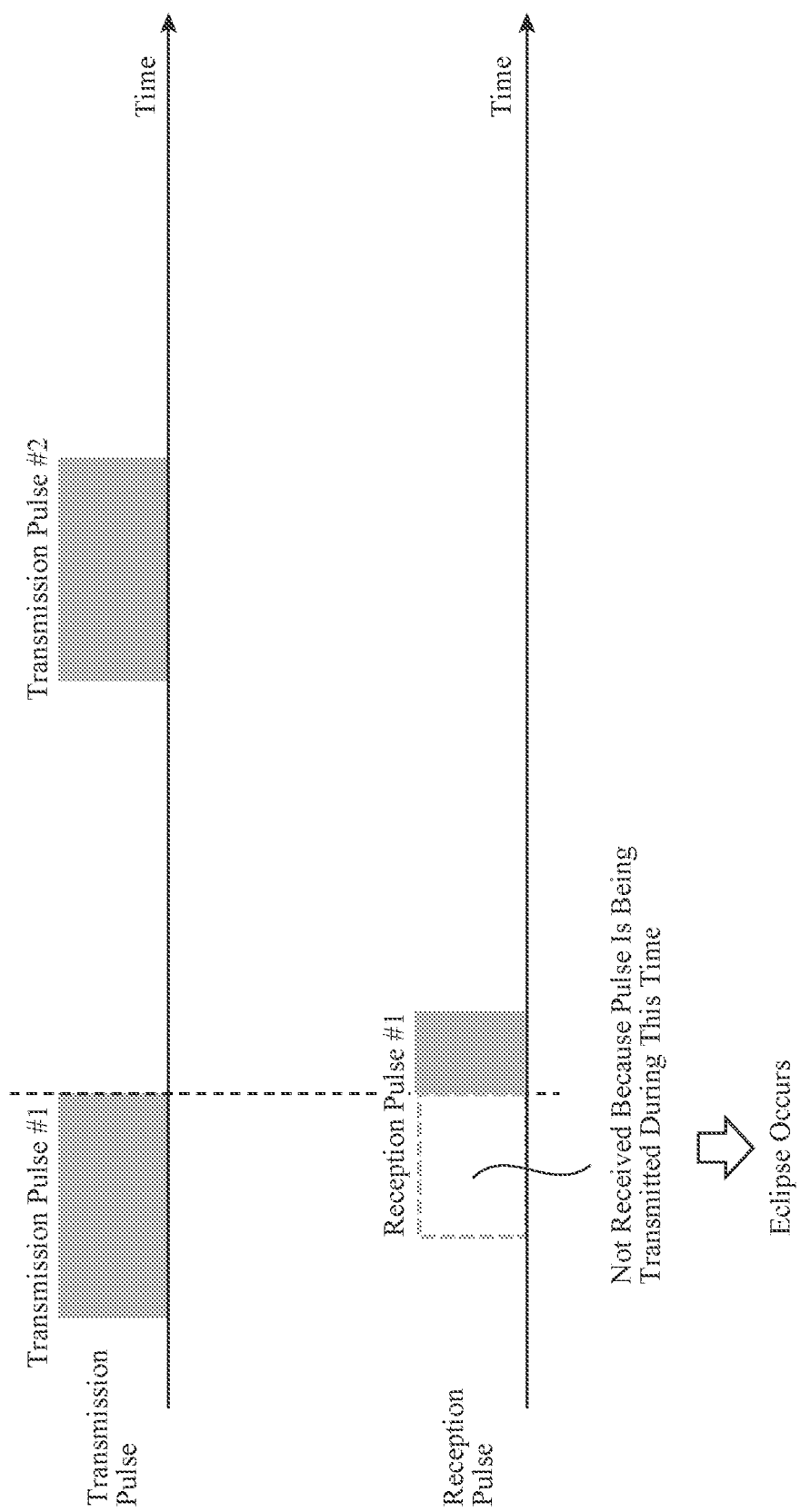
FIG. 12 is a diagram for explaining an eclipse.

In the radar device 108 as described above, since the reflection pulse signal from the target cannot be received while the pulse signal is transmitted, there is a problem that an eclipse occurs in the reception pulse signal. FIG. 12 is a diagram for describing an eclipse. As illustrated in FIG. 12, the radar device 108 as described above cannot receive the reception pulse #1 in a time period in which the transmission pulse #1 is transmitted. Thus, an eclipse occurs in the reception pulse signal.

Further, the transmission pulse width is limited from the viewpoint of reducing the eclipse, and there is a problem that it is difficult to sufficiently increase the transmission power depending on the CPI.

In the first embodiment described below, the problem as described above is solved.

Hereinafter, in order to describe the present disclosure in more detail, modes for carrying out the present disclosure will be described with reference to the accompanying drawings.

First Embodiment

Figure 1:
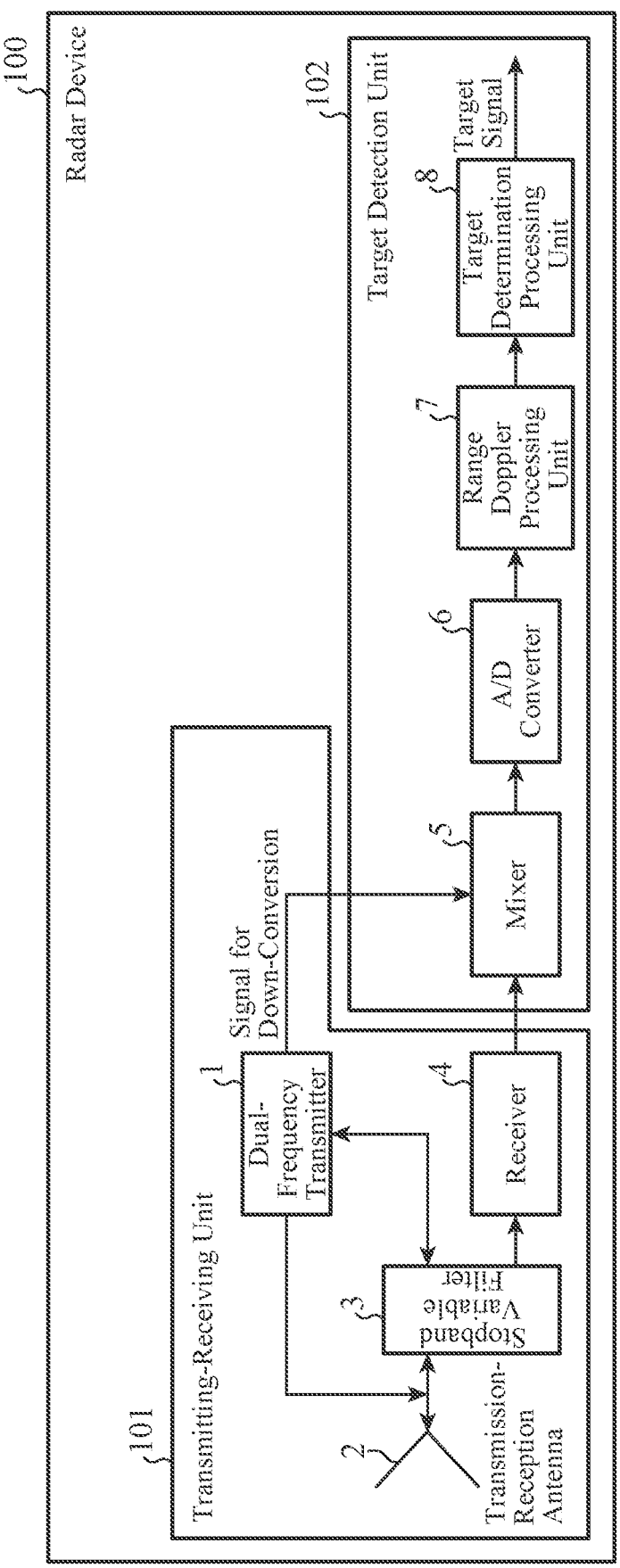
FIG. 1 is a block diagram illustrating a configuration of a radar device according to a first embodiment.

FIG. 1 is a block diagram illustrating a configuration of a radar device 100 according to the first embodiment. As illustrated in FIG. 1, the radar device 100 includes a transmitting-receiving unit 101 and a target detecting unit 102. The transmitting-receiving unit 101 includes a dual-frequency transmitter 1, a transmission-reception antenna 2, a stopband variable filter 3, and the receiver 4. The target detecting unit 102 includes the mixer 5, the A/D converter 6 (analog-to-digital converter), a range Doppler processing unit 7, and the target determination processing unit 8.

The transmitting-receiving unit 101 transmits a plurality of transmission signals having respective different frequency bands to a target at respective different timings, and acquires a reception signal by receiving a reflection signal reflected from the target. Note that, in the first embodiment, each of the plurality of transmission signals transmitted by the transmitting-receiving unit 101 is a pulse wave.

More specifically, while transmitting any one transmission signal out of the plurality of transmission signals, the transmitting-receiving unit 101 acquires, as a reception signal for target detection, a reception signal of a frequency band different from the frequency band of the transmission signal, and blocks a reception signal of the same frequency band as the frequency band of the transmission signal.

More specifically, in the first embodiment, the dual-frequency transmitter 1 and the transmission-reception antenna 2 constitute a transmitting unit (transmission device). The transmitting unit generates the plurality of transmission signals at respective different timings and transmits each of the generated plurality of transmission signals to the target. Further, the transmission-reception antenna 2, the stopband variable filter 3, and the receiver 4 constitute a receiving unit (reception device). The receiving unit acquires a reception signal by receiving a reflection signal in which each of the plurality of transmission signals transmitted by the transmitting unit is reflected by the target. The receiving unit sets in advance a frequency band of a reception signal to be blocked. The transmitting unit generates a transmission signal of the same frequency band as the frequency band set in advance by the receiving unit and transmits the generated transmission signal to the target.

More specifically, in the first embodiment, the dual-frequency transmitter 1 generates a plurality of transmission signals having respective different frequency bands at respective different timings. More specifically, in the first embodiment, the dual-frequency transmitter 1 generates two transmission signals having respective different frequency bands at respective different timings. The dual-frequency transmitter 1 outputs the generated transmission signals to the transmission-reception antenna 2. Further, the dual-frequency transmitter 1 outputs the signal for down-conversion to the mixer 5.

The transmission-reception antenna 2 transmits each of the plurality of transmission signals generated by the dual-frequency transmitter 1 to the target. More specifically, in the first embodiment, the transmission-reception antenna 2 transmits two transmission signals generated by the dual-frequency transmitter 1 to the target.

Further, the transmission-reception antenna 2 acquires a reception signal by receiving a reflection signal in which each of the plurality of transmission signals is reflected by the target. More specifically, in the first embodiment, the transmission-reception antenna 2 acquires the reception signal by receiving a reflection signal in which each of the two transmission signals is reflected by the target. The transmission-reception antenna 2 outputs the acquired reception signal to the stopband variable filter 3.

While the transmission-reception antenna 2 transmits any one transmission signal out of the plurality of transmission signals, the stopband variable filter 3 suppresses a reception signal of the same frequency band as the frequency band of the transmission signal, and acquires a reception signal for target detection by passing a reception signal of a frequency band different from the frequency band of the transmission signal. The stopband variable filter 3 outputs the acquired reception signal for target detection to the receiver 4.

More specifically, in the first embodiment, while the transmission-reception antenna 2 transmits any one transmission signal out of the two transmission signals, the stopband variable filter 3 suppresses a reception signal of the same frequency band as the frequency band of the transmission signal, and acquires a reception signal for target detection by passing a reception signal of a frequency band different from the frequency band of the transmission signal.

More specifically, in the first embodiment, the stopband variable filter 3 sets in advance the frequency band of the reception signal to be blocked. The stopband variable filter 3 outputs frequency band information indicating the frequency band set in advance to the dual-frequency transmitter 1. The dual-frequency transmitter 1 generates a transmission signal of the same frequency band as the frequency band indicated by the frequency band information.

On the other hand, the radar device 100 may have the following configuration instead of the configuration in which the receiving unit sets in advance the frequency band of the reception signal to be blocked, and the transmitting unit generates the transmission signal of the same frequency band as the frequency band as described above. That is, the transmitter may select in advance a transmission signal to be generated from the plurality of transmission signals, and the receiving unit may suppress a reception signal of the same frequency band as the frequency band of the transmission signal and pass a reception signal of a frequency band different from the frequency band of the transmission signal while the transmitting unit transmits the transmission signal selected in advance.

In this case, the dual-frequency transmitter 1 selects the transmission signal to be generated from the plurality of transmission signals in advance. The dual-frequency transmitter 1 outputs the frequency band information indicating the frequency band of the transmission signal selected in advance to the stopband variable filter 3. The stopband variable filter 3 suppresses a reception signal of the same frequency band as the frequency band indicated by the frequency band information, and passes a reception signal of a frequency band different from the frequency band indicated by the frequency band information as a reception signal for target detection.

The receiver 4 performs the band limitation and the phase detection on the reception signal for target detection. The receiver 4 outputs the reception signal for target detection subjected to the band limitation and the phase detection to the mixer 5. The target detecting unit 102 detects a target on the basis of the reception signal acquired by the transmitting-receiving unit 101. More specifically, the target detecting unit 102 detects the target on the basis of the reception signal for target detection acquired by the transmitting-receiving unit 101.

More specifically, in the first embodiment, the mixer 5 down-converts the reception signal for target detection acquired by the transmitting-receiving unit 101. In other words, the mixer 5 frequency-converts the reception signal for target detection into the baseband using the signal for down-conversion output from the dual-frequency transmitter 1. The mixer 5 outputs the down-converted reception signal for target detection to the A/D converter 6.

The A/D converter 6 (analog-to-digital converter) converts the reception signal for target detection down-converted by the mixer 5 from an analog signal into a digital signal. The A/D converter 6 outputs the reception signal for target detection converted into a digital signal to the range Doppler processing unit 7.

The range Doppler processing unit 7 calculates a range Doppler signal indicating a target speed and a distance to the target on the basis of the reception signal for target detection converted into a digital signal by the A/D converter 6. The range Doppler processing unit 7 outputs the calculated range Doppler signal to the target determination processing unit 8.

More specifically, in the first embodiment, the range Doppler processing unit 7 estimates the Doppler frequency on the basis of a phase rotation in the pulse, and measures the target distance using a difference of a phase rotation determined depending on the target distance and the transmission frequency.

More specifically, in the first embodiment, the range Doppler processing unit 7 corrects the phase rotation in the pulse caused by movement of the target and the phase rotation determined depending on the distance to the target and a difference between the transmission frequencies in the reception signal for target detection converted into the digital signal by the A/D converter 6. Further, the range Doppler processing unit 7 calculates the range Doppler signal by performing coherent integration on the corrected reception signal for target detection.

The target determination processing unit 8 determines the presence or absence of a target on the basis of the range Doppler signal calculated by the range Doppler processing unit 7. Thus, the target determination processing unit 8 detects the target.

Hereinafter, operation of the radar device 100 according to the first embodiment will be described. First, the dual-frequency transmitter 1 alternately generates a pulse a of a transmission frequency fa and a pulse b of a transmission frequency fb, and the transmission-reception antenna 2 alternately transmits the pulse a and the pulse b in a form of radio waves to the target. Then, the transmission pulse a and the transmission pulse b are reflected by the target, individually. The transmission-reception antenna 2 acquires the reception pulse a and the reception pulse b by receiving the transmission pulse a and the transmission pulse b reflected by the target at respective different timings. The transmission-reception antenna 2 outputs the acquired reception pulse a and reception pulse b to the stopband variable filter 3 at respective different timings.

Figure 2:
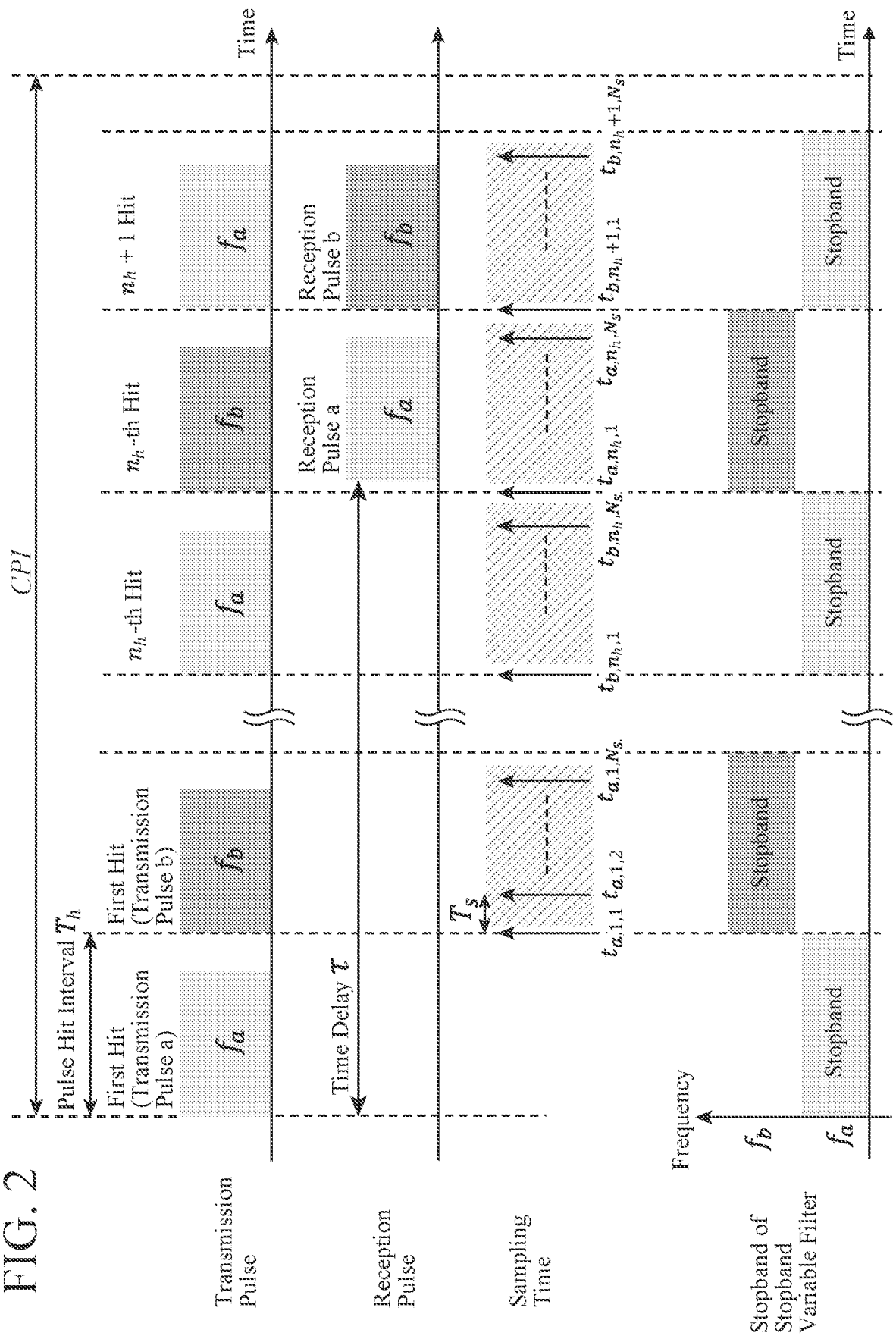
FIG. 2 is a diagram illustrating a relationship between a transmission-reception pulse and a frequency band blocked by a stopband variable filter.

FIG. 2 is a diagram illustrating a relationship between a transmission-reception pulse and a frequency band blocked by the stopband variable filter 3. As illustrated in FIG. 2, the transmission-reception antenna 2 receives the reception pulse b in a time period in which the transmission pulse a is transmitted. Further, the stopband variable filter 3 sets the frequency band of the transmission pulse a as a stopband in order to prevent leakage of the transmission pulse a into the receiver 4 in the time period. Here, for example, the dual-frequency transmitter 1 selects in advance the transmission signal to be generated as the transmission pulse a, and the stopband variable filter 3 acquires the frequency band information from the dual-frequency transmitter 1, sets the frequency band of the transmission pulse a indicated by the frequency band information as the stopband, and sets the frequency band of the reception pulse b as a passband. Alternatively, for example, the stopband variable filter 3 sets in advance the frequency band of the reception pulse a as the stopband, and the dual-frequency transmitter 1 acquires the frequency band information from the stopband variable filter 3 and generates the transmission pulse a of the same frequency band as the frequency band indicated by the frequency band information.

On the other hand, the transmission-reception antenna 2 receives the reception pulse a in the time period in which the transmission pulse b is transmitted. Further, the stopband variable filter 3 sets the frequency band of the transmission pulse b as the stopband in the time period. Here, for example, the dual-frequency transmitter 1 selects in advance the transmission signal to be generated as the transmission pulse b, and the stopband variable filter 3 acquires the frequency band information from the dual-frequency transmitter 1, sets the frequency band of the transmission pulse b indicated by the frequency band information as the stopband, and sets the frequency band of the reception pulse a as the passband. Alternatively, for example, the stopband variable filter 3 sets in advance the frequency band of the reception pulse b as the stopband, and the dual-frequency transmitter 1 acquires the frequency band information from the stopband variable filter 3 and generates the transmission pulse b of the same frequency band as the frequency band indicated by the frequency band information.

The reception pulse a or the reception pulse b that has passed through the stopband variable filter 3 is transmitted to the receiver 4. The reception pulse a or the reception pulse b processed by the receiver 4 is transmitted to the mixer 5.

The mixer 5 acquires the signal for down-conversion corresponding to the transmission frequency fa from the dual-frequency transmitter 1 at a time t ($T_h \leq t \leq 2T_h$, $3T_h \leq t \leq 4T_h$, ...) at which the reception pulse a is received, and generates a mixing signal $s_{ja}(t)$ by frequency-converting the reception pulse a into the baseband using the signal for down-conversion. Meanwhile, the mixer 5 acquires a signal for down-conversion corresponding to the transmission frequency fb from the dual-frequency transmitter 1 at a time t ($2T_h \leq t \leq 3T_h$, $4T_h \leq t \leq 5T_h$, ...) at which the reception pulse b is received, and generates a mixing signal $s_{jb}(t)$ by frequency-converting the reception pulse b into the baseband using the signal for down-conversion.

The A/D converter 6 generates an A/D converted signal $s_{ja}(t_{a,\ nh,\ ns})$ by sampling the mixing signal $s_{jb}(t)$ at a time $t_{a.nh,\ ns}$ with the $n_s$-th sampling time at the $n_h$-th hit of the transmission pulse a as $t_{a.nh,\ ns}$ ($1 \leq n_s \leq N_s$) (h and s indicated to the right of n are each a subscript of n). On the other hand, the A/D converter 6 generates an A/D converted signal $s_{jb}(t_{b,\ nh,\ ns})$ by sampling the mixing signal $s_{jb}(t)$ at a time $t_{b.nh,\ ns}$ with the $n_s$-th sampling time at the $n_h$-th hit of the transmission pulse b as $t_{b.nh,\ ns}$ ($1 \leq n_s \leq N_s$).

The A/D converter 6 outputs the generated A/D converted signal $s_{ja}(t_{a,\ nh,\ ns})$ to the range Doppler processing unit 7. Further, the dual-frequency transmitter 1 generates a transmission pulse b having a transmission frequency fb, and the transmission-reception antenna 2 transmits the transmission pulse b to a target. Thereafter, a similar operation is performed, thereby the A/D converter 6 generates the A/D converted signal $s_{jb}(t_{b,\ nh,\ ns})$ ($1 \leq n_s \leq N_s$). The A/D converted signals $s_{ja}(t_{a,\ nh,\ ns})$ and $s_{jb}(t_{b,\ nh,\ ns})$ are transmitted to the range Doppler processing unit 7.

Figure 3:
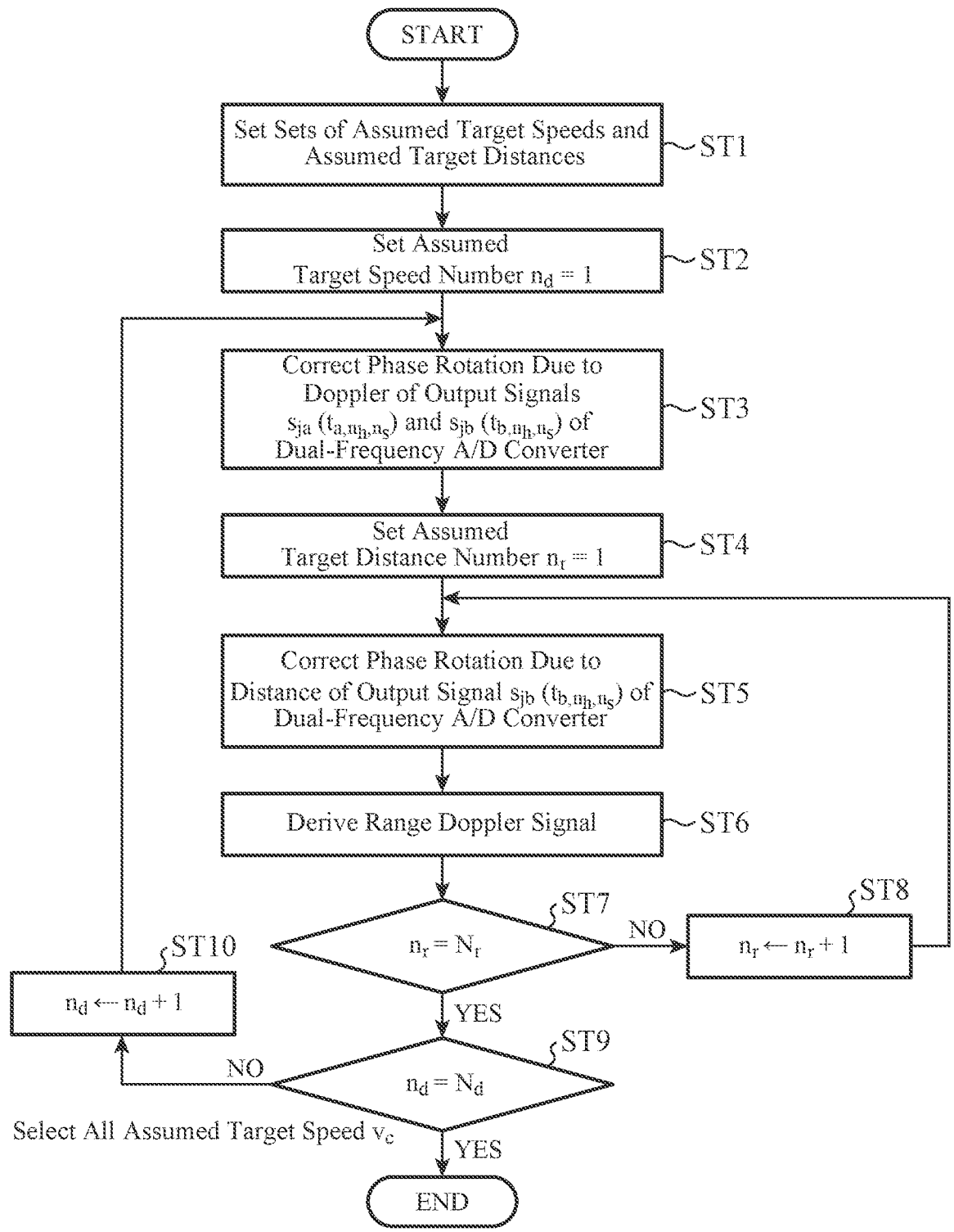
FIG. 3 is a flowchart illustrating a processing procedure performed in a range Doppler processing unit according to the first embodiment.

FIG. 3 is a flowchart illustrating a processing procedure performed in the range Doppler processing unit 7 according to the first embodiment. First, the range Doppler processing unit 7 sets a set of assumed target speeds and a set of assumed target distances (step ST1). Here, a set of assumed target speeds is $v_{c,\ 1} \ldots v_{c,\ Nd}$ (d indicated to the right of N is a subscript of N). Further, a set of assumed target distances is $R_{c,\ 1} \ldots R_{c,\ Nr}$ (r indicated to the right of N is a subscript of N).

Next, the range Doppler processing unit 7 sets $n_d=1$ and selects an assumed target speed $v_{c,\ nd}$ (step ST2) (d indicated to the right of n is a subscript of n).

Next, in step ST3, the range Doppler processing unit 7 calculates a phase correction signal $s_{ca,\ nh,\ ns}(n_d)$ by correcting the phase of the A/D converted signal $s_{ja}(t_{a,\ nh,\ ns})$ according to the following Expression (2). Note that, in Expression (2), c represents the speed of light.

$$s_{ca,n_h,n_s}(n_d) = s_{ja}(t_{a,n_h,n_s}) \cdot \exp\left(-j2\pi \frac{2v_{c,n_d}}{c} f_a\, t_{a,n_h,n_s}\right) \quad (2)$$

Further, in step ST3, the range Doppler processing unit 7 calculates a phase correction signal $s'_{cb,\ nh,\ ns}(n_d)$ by correcting the phase of the A/D converted signal $s_{jb}(t_{b,\ nh,\ ns})$ according to the following Expression (3).

$$s'_{cb,n_h,n_s}(n_d) = s_{jb}(t_{b,n_h,n_s}) \cdot \exp\left(-j2\pi \frac{2v_{c,n_d}}{c} f_b\, t_{b,n_h,n_s}\right) \quad (3)$$

Through the above processing of step ST3, the range Doppler processing unit 7 corrects the phase rotation in the pulse (the phase rotation in the pulse due to the Doppler effect) caused by movement of the target (target speed $v_{c,\,n_d}$) in the A/D converted signals $s_{ja}(t_{a,\,nh,\,ns})$ and $s_{jb}(t_{b,\,nh,\,ns})$.

Next, the range Doppler processing unit 7 sets $n_r=1$ and selects an assumed target distance $R_{c,\,nr}$ (step ST4).

Next, the range Doppler processing unit 7 calculates a phase correction signal $s_{cb,\,nh,\,ns}(n_r, n_d)$ by correcting the phase of an output signal $s'_{jb}(t_{b,\,nh,\,ns})$ of the A/D converter according to the following Expression (4) (step ST5).

$$s_{cb,n_h,n_s}(n_r, n_d) = s'_{cb,n_h,n_s}(n_d) \cdot \exp\left(j2\pi(f_b - f_a)\frac{2R_{c,n_r}}{c}\right) \quad (4)$$

Through the processing of step ST5, the range Doppler processing unit 7 corrects a phase rotation determined by the distance to the target (target distance $R_{c,\,nr}$) and the difference between the transmission frequencies (frequency difference $f_b-f_a$) in the output signal $s'_{jb}(t_{b,\,nh,\,ns})$ of the A/D converter.

Next, the range Doppler processing unit 7 calculates the range Doppler signal $s_{rd}(n_r, n_d)$ according to the following Expression (5) (step ST6).

$$s_{rd}(n_r, n_d) = \sum_{n_s=1}^{N_s}\sum_{n_h=1}^{N_h}\left(s_{ca,n_h,n_s}(n_d) + s_{cb,n_h,n_s}(n_r, n_d)\right) \quad (5)$$

Next, the range Doppler processing unit 7 determines whether or not $n_r=N_r$ is satisfied (step ST7). Thus, the range Doppler processing unit 7 determines whether or not there is an assumed target distance that has not been selected. When it is determined that $n_r=N_r$ is not satisfied (NO in step ST7), the range Doppler processing unit 7 proceeds to processing of step ST8, and when it is determined that $n_r=N_r$ is satisfied (YES in step ST7), the range Doppler processing unit 7 proceeds to processing of step ST9.

In step ST8, the range Doppler processing unit 7 adds 1 to $n_r$, and returns to the processing of step ST5. Then, the range Doppler processing unit 7 repeatedly executes each processing from step ST5 to step ST8 until it is determined in step ST7 that $n_r=N_r$ is satisfied.

In step ST9, the range Doppler processing unit 7 determines whether or not $n_d=N_d$ is satisfied. Thus, the range Doppler processing unit 7 determines whether or not there is an assumed target speed that has not been selected.

When it is determined that $n_d=N_d$ is not satisfied (NO in step ST9), the range Doppler processing unit 7 adds 1 to $n_d$, and returns to the processing of step ST3. Then, until it is determined that $n_d=N_d$ is satisfied in step ST9, the range Doppler processing unit 7 repeatedly executes each process from steps ST3 to ST7 and each process of steps ST9 and ST10.

When it is determined in step ST9 that $n_d=N_d$ is satisfied (YES in step ST9), the range Doppler processing unit 7 ends the processing. The range Doppler processing unit 7 outputs the calculated range Doppler signal $s_{rd}(n_r, n_d)$ to the target determination processing unit 8.

The target determination processing unit 8 determines the presence or absence of a target by comparing the range Doppler signal $s_{rd}(n_r, n_d)$ calculated by the range Doppler processing unit 7 with the threshold value (threshold).

In the first embodiment, since the radar device 100 is configured as described above, the next pulse can be transmitted while receiving the pulse reflected by the target. Thus, it is possible to reduce the eclipse in the reception signal. Further, since the pulse width can be made long, a transmission with sufficiently large power can be performed even with a relatively short CPI.

As described above, the radar device 100 according to the first embodiment includes the transmitting-receiving unit 101 to transmit a plurality of transmission signals having respective different frequency bands to a target at respective different timings and acquire a reception signal by receiving a reflection signal reflected from the target, and the target detecting unit 102 that detects the target on the basis of the reception signal acquired by the transmitting-receiving unit 101, in which while transmitting any one transmission signal out of the plurality of transmission signals, the transmitting-receiving unit 101 acquires, as a reception signal for target detection, a reception signal of a frequency band different from a frequency band of the transmission signal, and blocks a reception signal of the same frequency band as the frequency band of the transmission signal, and the target detecting unit 102 detects the target on the basis of the reception signal for target detection acquired by the transmitting-receiving unit 101.

With the above configuration, while the transmission signal is transmitted, the reception signal of the frequency band different from the frequency band of the transmission signal is acquired as the reception signal for target detection. Therefore, the eclipse can be reduced. Further, the transmission signal can be transmitted with sufficiently large power even with a relatively short CPI.

The transmitting-receiving unit 101 in the radar device 100 according to the first embodiment includes the transmitting unit to generate the plurality of transmission signals at respective different timings and transmit each of the generated plurality of transmission signals to the target, and the receiving unit to acquire a reception signal by receiving a reflection signal in which each of the plurality of transmission signals transmitted by the transmitting unit is reflected by the target, the receiving unit sets in advance a frequency band of a reception signal to be blocked, and the transmitting unit generates a transmission signal of the same frequency band as the frequency band set in advance by the receiving unit and transmits the generated transmission signal to the target.

With the above configuration, while the transmitting unit transmits a transmission signal of a frequency band different from the frequency band set in advance by the receiving unit, the receiving unit acquires a reception signal for target detection of the frequency band set in advance by the receiving unit. Therefore, the eclipse can be reduced.

Alternatively, the transmitting unit in the radar device 100 according to the first embodiment selects a transmission signal to be generated from the plurality of transmission signals in advance, and while the transmitting unit transmits the transmission signal selected in advance, the receiving unit acquires a reception signal of a frequency band different from a frequency band of the transmission signal as the reception signal for target detection.

With the above configuration, while the transmitting unit transmits a transmission signal of a frequency band selected in advance, the receiving unit acquires the reception signal for target detection of a frequency band different from the frequency band selected in advance by the transmitting unit. Therefore, the eclipse can be reduced.

The transmitting-receiving unit 101 in the radar device 100 according to the first embodiment includes the stopband variable filter to, while the transmitting-receiving unit 101 transmits any one transmission signal out of the plurality of transmission signals, the stopband variable filter, suppress a reception signal of the same frequency band as a frequency band of the transmission signal, and acquire the reception signal for target detection by passing a reception signal of a frequency band different from the frequency band of the transmission signal.

With the above configuration, while the transmission signal is transmitted, the reception signal of the same frequency band as the frequency band of a transmission signal is suppressed, and the reception signal of the frequency band different from the frequency band of the transmission signal is acquired as the reception signal for target detection. Therefore, the eclipse can be reduced.

The target detecting unit 102 in the radar device 100 according to the first embodiment includes the mixer 5 that down-converts the reception signal for target detection acquired by the transmitting-receiving unit 101, the A/D converter 6 (analog-to-digital converter) that converts the reception signal for target detection down-converted by the mixer 5 from an analog signal into a digital signal, the range Doppler processing unit 7 that calculates a range Doppler signal indicating a speed of the target and a distance to the target on the basis of the reception signal for target detection converted into a digital signal by the A/D converter 6, and the target determination processing unit 8 that determines presence or absence of the target on the basis of the range Doppler signal calculated by the range Doppler processing unit 7.

With the above configuration, the target can be detected based on the reception signal for target detection acquired by the above method.

Each of the plurality of transmission signals in the radar device 100 according to the first embodiment is a pulse wave, and the range Doppler processing unit 7 corrects a phase rotation within a pulse caused by movement of the target and a phase rotation determined by a distance to the target and a difference between transmission frequencies in the reception signal for target detection converted into a digital signal by the A/D converter 6, and calculates the range Doppler signal by performing coherent integration on the corrected reception signal for target detection.

With the above configuration, the range Doppler signal can be suitably calculated. Therefore, the target can be suitably detected.

Second Embodiment

Figure 4:
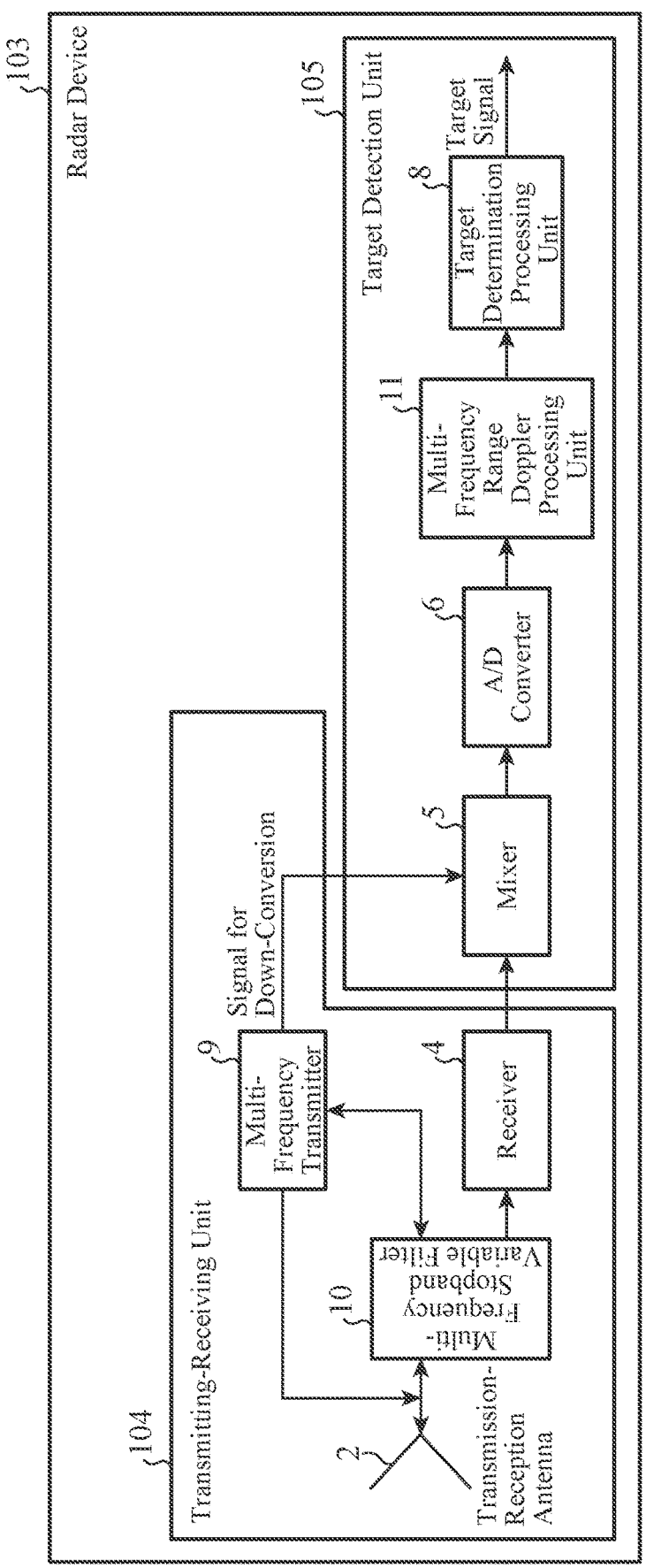
FIG. 4 is a block diagram illustrating a configuration of a radar device according to a second embodiment.

Hereinafter, a second embodiment will be described with reference to the drawings. Note that configuration components having functions similar to those described in the first embodiment are denoted by the same reference numerals, and description thereof will be omitted. FIG. 4 is a block diagram illustrating a configuration of the radar device 103 according to the second embodiment. As illustrated in FIG. 4, in the radar device 103, as compared with the radar device 100 according to the first embodiment, the transmitting-receiving unit 104 includes a multi-frequency transmitter 9 instead of the dual-frequency transmitter 1, a multi-frequency stopband variable filter 10 instead of the stopband variable filter 3, and the target detecting unit 105 includes a multi-frequency range Doppler processing unit 11 instead of the range Doppler processing unit 7.

The multi-frequency transmitter 9 generates three or more transmission signals having respective different frequency bands at respective different timings. More specifically, in the second embodiment, the multi-frequency transmitter 9 generates three transmission signals having respective different frequency bands at respective different timings. The multi-frequency transmitter 9 outputs the generated transmission signal to the transmission-reception antenna 2. Further, the multi-frequency transmitter 9 outputs the signal for down-conversion to the mixer 5.

The multi-frequency stopband variable filter 10 is a filter capable of changing a stopband between three frequency bands. While the transmission-reception antenna 2 transmits any one transmission signal out of the three transmission signals, the multi-frequency stopband variable filter 10 suppresses a reception signal of the same frequency band as the frequency band of the transmission signal, and acquires a reception signal for target detection by passing a reception signal of a frequency band different from the frequency band of the transmission signal. The stopband variable filter 3 outputs the acquired reception signal for target detection to the receiver 4.

The multi-frequency range Doppler processing unit 11 calculates a range Doppler signal indicating a speed of the target and a distance to the target on the basis of the three reception signals for target detection (corresponding to the three transmission signals) converted into digital signals by the A/D converter 6. The multi-frequency range Doppler processing unit 11 outputs the calculated range Doppler signal to the target determination processing unit 8.

Hereinafter, operation of the radar device 103 according to the second embodiment will be described. First, the multi-frequency transmitter 9 sequentially and repeatedly generates the pulse a of the transmission frequency $f_a$, the pulse b of the transmission frequency $f_b$, and the pulse c of the transmission frequency $f_c$, and the transmission-reception antenna 2 sequentially and repeatedly transmits the pulse a, the pulse b, and the pulse c in a form of radio waves to a target. The transmission pulse a, the transmission pulse b, and the transmission pulse c are reflected by the target. The transmission-reception antenna 2 acquires the reception pulse a, the reception pulse b, and the reception pulse c by receiving the transmission pulse a, the transmission pulse b, and the transmission pulse c reflected by the target at respective different timings. The transmission-reception antenna 2 outputs the acquired reception pulse a, reception pulse b, and reception pulse c to the multi-frequency stopband variable filter 10 at respective different timings.

Figure 5:
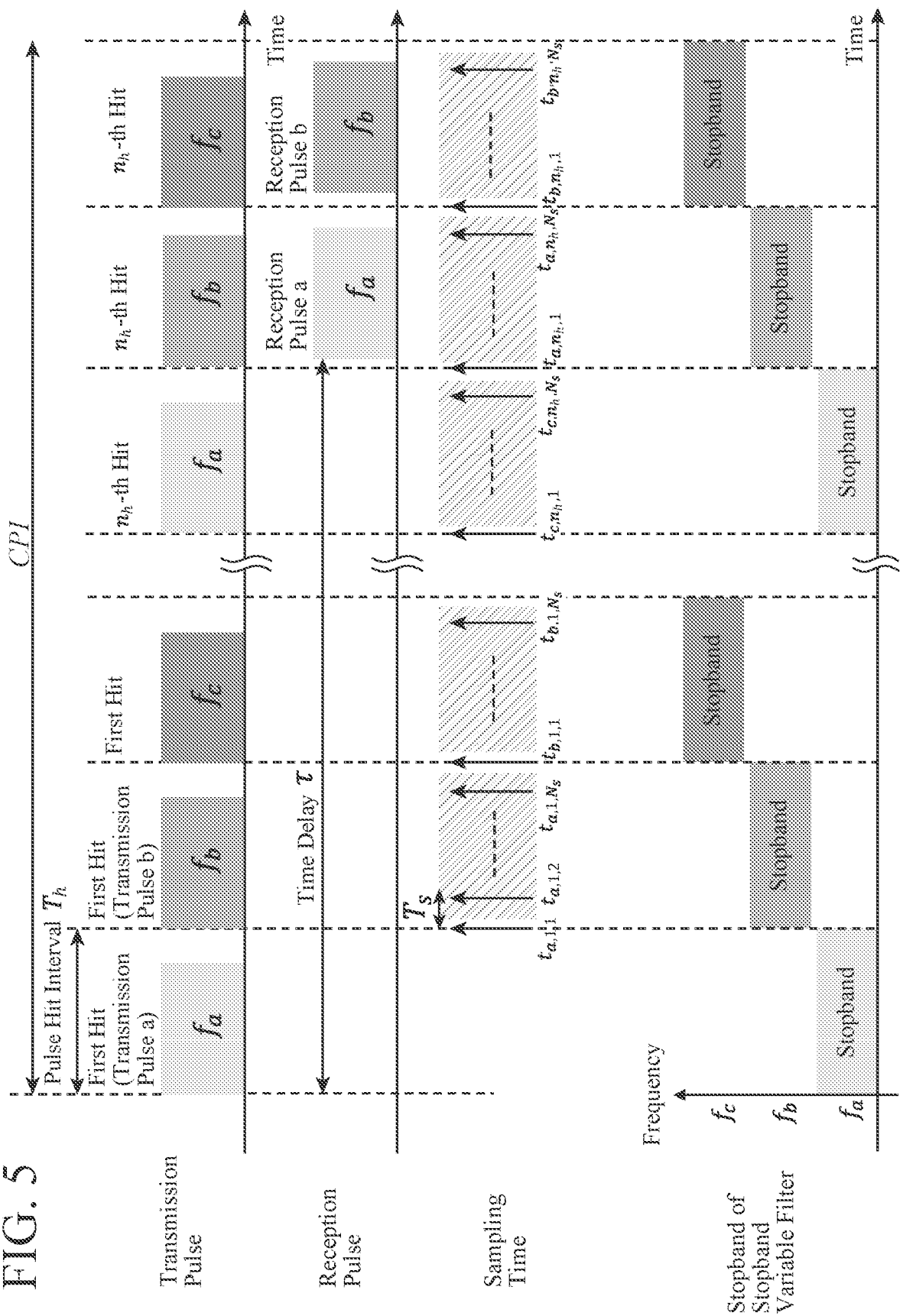
FIG. 5 is a diagram illustrating a relationship between a transmission-reception pulse and a frequency band blocked by a multi-frequency stopband variable filter.

FIG. 5 is a diagram illustrating a relationship between the transmission-reception pulse and the frequency band (stopband) blocked by the multi-frequency stopband variable filter 10. As illustrated in FIG. 5. The transmission-reception antenna 2 receives the reception pulse a in a time period in which the transmission pulse b is transmitted. Further, in the multi-frequency stopband variable filter 10, the frequency band of the transmission pulse b is set as the stopband by the multi-frequency stopband variable filter 10 in order to prevent the transmission pulse b from leaking into the receiver 4 in the time period. Here, for example, the multi-frequency transmitter 9 selects in advance the transmission signal to be generated as the transmission pulse b, and the multi-frequency stopband variable filter 10 acquires the frequency band information from the multi-frequency transmitter 9, sets the frequency band of the transmission pulse b indicated by the frequency band information as the stopband, and sets each frequency band of the reception pulse a and the reception pulse c as the passband. Alternatively, for example, the multi-frequency stopband variable filter 10 sets in advance the frequency band of the reception pulse b as the stopband, and the multi-frequency transmitter 9 acquires the frequency band information from the multi-frequency stopband variable filter 10 and generates the transmission pulse b of the same frequency band as the frequency band indicated by the frequency band information.

On the other hand, the transmission-reception antenna 2 receives the reception pulse b in the time period in which the transmission pulse c is transmitted. Further, the multi-frequency stopband variable filter 10 sets the frequency band of the transmission pulse c as the stopband in the time period. Here, for example, the multi-frequency transmitter 9 selects in advance the transmission signal to be generated as the transmission pulse c, and the multi-frequency stopband variable filter 10 acquires the frequency band information from the multi-frequency transmitter 9, sets the frequency band of the transmission pulse c indicated by the frequency band information as the stopband, and sets each frequency band of the reception pulse a and the reception pulse b as the passband. Alternatively, for example, the multi-frequency stopband variable filter 10 sets in advance the frequency band of the reception pulse c as the passband, and the multi-frequency transmitter 9 acquires the frequency band information from the multi-frequency stopband variable filter 10 and generates the transmission pulse c of the same frequency band as the frequency band indicated by the frequency band information.

The reception pulse a, the reception pulse b, or the reception pulse c that has passed through the multi-frequency stopband variable filter 10 is transmitted to the receiver 4. The reception pulse a, the reception pulse b, or the reception pulse c processed by the receiver 4 is transmitted to the mixer 5.

Thereafter, the radar device 103 operates similarly to the radar device 100 according to the first embodiment, and as a result, the A/D converter 6 generates the A/D converted signals $s_{ja}(t_{a, nh, ns})$, $s_{jb}(t_{b, nh, ns})$, and $s_{jc}(t_{c, nh, ns})$ (h and s indicated to the right of n are each a subscript of n), and outputs the A/D converted signals to the multi-frequency range Doppler processing unit 11.

Figure 6:
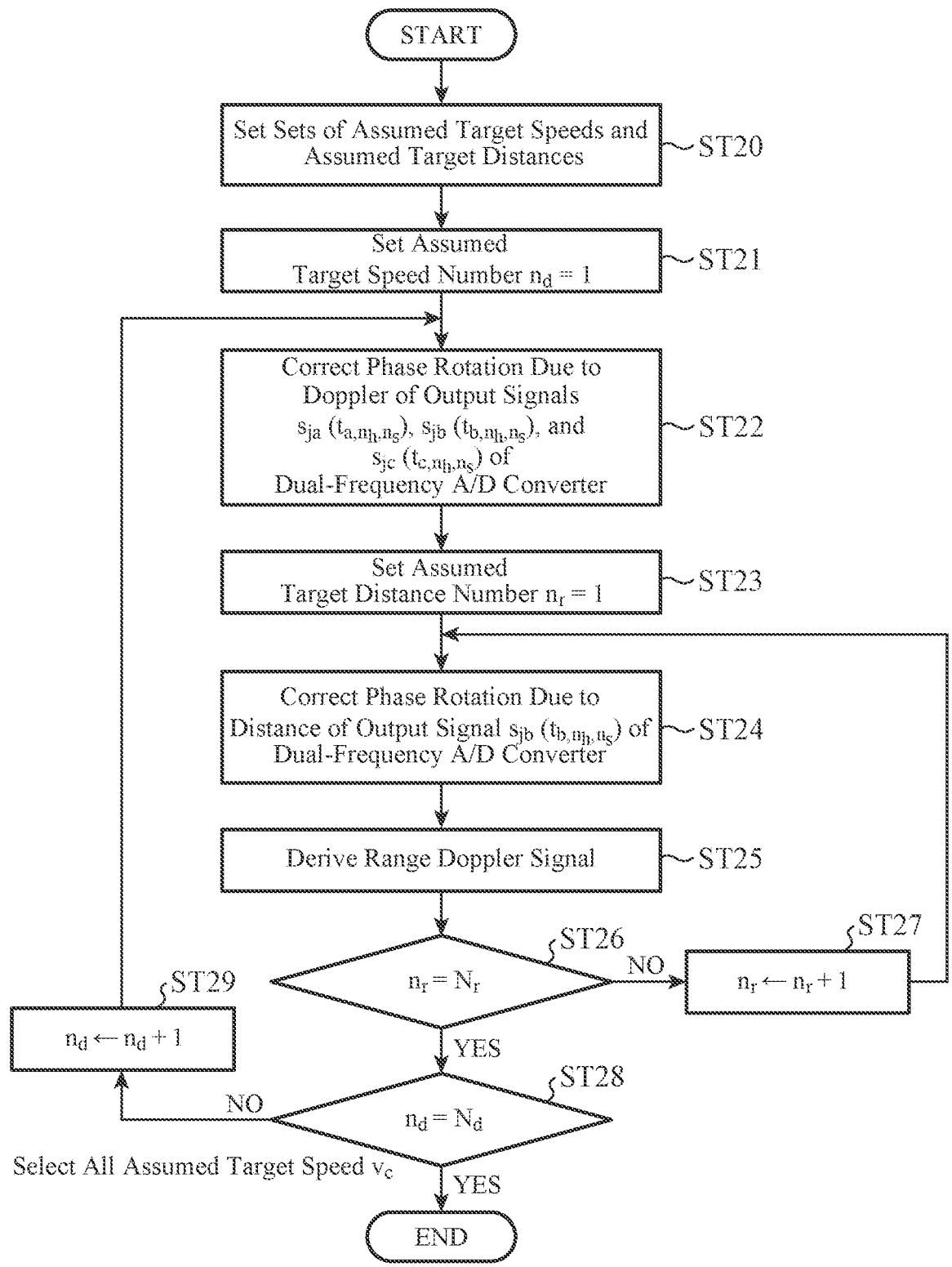
FIG. 6 is a flowchart illustrating a processing procedure performed in a multi-frequency range Doppler processing unit according to the second embodiment.

FIG. 6 is a flowchart illustrating a processing procedure performed in the multi-frequency range Doppler processing unit 11 according to the second embodiment. First, the multi-frequency range Doppler processing unit 11 sets a set of assumed target speeds and a set of assumed target distances (step ST20). Here, a set of assumed target speeds is $v_{c, 1} \ldots v_{c, Nd}$ (d indicated to the right of N is a subscript of N). Further, a set of assumed target distances is $R_{c, 1} \ldots R_{c, Nr}$.

Next, the multi-frequency range Doppler processing unit 11 sets $n_d=1$ and selects the assumed target speed $v_{c, nd}$ (step ST21) (d indicated to the right of n is a subscript of n).

Next, in step ST22, the multi-frequency range Doppler processing unit 11 calculates the phase correction signal $s_{ca, nh, ns}(n_d)$ by correcting the phase of the A/D converted signal $s_{ja}(t_{a, nh, ns})$ according to the following Expression (6). Note that, in Expression (6), c represents the speed of light.

$$s_{ca,n_h,n_s}(n_d) = s_{ja}(t_{a,n_h,n_s}) \cdot \exp\left(-j2\pi \frac{2v_{c,n_d}}{c} f_a t_{a,n_h,n_s}\right) \quad (6)$$

Further, in step ST22, the multi-frequency range Doppler processing unit 11 calculates the phase correction signal $s'_{cb, nh, ns}(n_d)$ by correcting the phase of the A/D converted signal $s_{jb}(t_{b, nh, ns})$ according to the following Expression (7).

$$s'_{cb,n_h,n_s}(n_d) = s_{jb}(t_{b,n_h,n_s}) \cdot \exp\left(-j2\pi \frac{2v_{c,n_d}}{c} f_b t_{b,n_h,n_s}\right) \quad (7)$$

Further, in step ST22, the multi-frequency range Doppler processing unit 11 further calculates a phase correction signal $s'_{cc, nh, ns}(n_d)$ by correcting the phase of the A/D converted signal $s_{jc}(t_{c, nh, ns})$ according to the following Expression (8).

$$s'_{cc,n_h,n_s}(n_d) = s_{jc}(t_{c,n_h,n_s}) \cdot \exp\left(-j2\pi \frac{2v_{c,n_d}}{c} f_c t_{c,n_h,n_s}\right) \quad (8)$$

Through the above processing of step ST22, the multi-frequency range Doppler processing unit 11 corrects the phase rotation in the pulse (the phase rotation in the pulse due to the Doppler effect) caused by movement of the target (target speed $v_{c, nd}$) in the A/D converted signals $s_{ja}(t_{a, nh, ns})$, $s_{jb}(t_{b, nh, ns})$, and $s_{jc}(t_{c, nh, ns})$.

Next, the multi-frequency range Doppler processing unit 11 sets $n_r=1$ and selects the assumed target distances $R_{c, nr}$ (step ST23).

Next, in step ST24, the multi-frequency range Doppler processing unit 11 calculates the phase correction signal $s_{cb, nh, ns}(n_r, n_d)$ by correcting the phase of the output signal $s'_{cb, nh, ns}(n_d)$ of the A/D converter according to the following Expression (9).

$$s_{cb,n_h,n_s}(n_r, n_d) = s'_{cb,n_h,n_s}(n_d) \cdot \exp\left(j2\pi(f_b - f_a)\frac{2R_{c,n_r}}{c}\right) \quad (9)$$

Further, in step ST24, the multi-frequency range Doppler processing unit 11 calculates a phase correction signal $s_{cc, nh, ns}(n_r, n_d)$ by correcting the phase of the output signal $s'_{cc, nh, ns}(n_d)$ of the A/D converter according to the following Expression (10).

$$s_{cc,n_h,n_s}(n_r, n_d) = s'_{cc,n_h,n_s}(n_d) \cdot \exp\left(j2\pi(f_c - f_a)\frac{2R_{c,n_r}}{c}\right) \quad (10)$$

Through the processing of step ST24, the multi-frequency range Doppler processing unit 11 corrects the phase rotation determined by the distance to the target (target distance $R_{c, nr}$) and the differences between the transmission frequencies (frequency difference $f_b-f_a$ and frequency difference $f_c-f_a$) in the output signals $s'_{cb, nh, ns}(n_d)$ and $s'_{cc, nh, ns}(n_d)$ of the A/D converter.

Next, the multi-frequency range Doppler processing unit 11 calculates the range Doppler signal $s_{rd}(n_r, n_d)$ according to the following Expression (11) (step ST25).

$$s_{rd}(n_r, n_d) = \sum_{n_s=1}^{N_s} \sum_{n_h=1}^{N_h} \left(s_{ca,n_h,n_s}(n_d) + s_{cb,n_h,n_s}(n_r, n_d) + s_{cc,n_h,n_s}(n_r, n_d)\right) \quad (11)$$

Next, the multi-frequency range Doppler processing unit 11 determines whether or not $n_r=N_r$ is satisfied (step ST26). Thus, the multi-frequency range Doppler processing unit 11 determines whether or not there is an assumed target distance that has not been selected. When it is determined that $n_r=N_r$ is not satisfied (NO in step ST26), the multi-frequency range Doppler processing unit 11 proceeds to processing of step ST27, and when it is determined that $n_r=N_r$ is satisfied (YES in step ST26), the multi-frequency range Doppler processing unit 11 proceeds to processing of step ST28.

In step ST27, the multi-frequency range Doppler processing unit 11 adds 1 to $n_r$ and returns to the processing of step ST24. Then, in step ST26, the multi-frequency range Doppler processing unit 11 repeatedly executes each processing from steps ST24 to ST27 until it is determined that $n_r=N_r$ is satisfied.

In step ST28, the multi-frequency range Doppler processing unit 11 determines whether or not $n_d=N_d$ is satisfied. Thus, the multi-frequency range Doppler processing unit 11 determines whether or not there is an assumed target speed that has not been selected.

When it is determined that $n_d=N_d$ is not satisfied (NO in step ST28), the multi-frequency range Doppler processing unit 11 adds 1 to n, and returns to the processing of step ST22. Then, in step ST28, the multi-frequency range Doppler processing unit 11 repeatedly executes each process from steps ST22 to ST26 and each process of steps ST28 and ST29 until it is determined that $n_d=N_d$ is satisfied.

When it is determined in step ST28 that $n_d=N_d$ is satisfied (YES in step ST28), the multi-frequency range Doppler processing unit 11 ends the processing. The multi-frequency range Doppler processing unit 11 outputs the calculated range Doppler signal $s_{rd}(n_r, n_d)$ to the target determination processing unit 8.

The target determination processing unit 8 determines the presence or absence of a target by comparing the range Doppler signal $s_{rd}(n_r, n_d)$ calculated by the multi-frequency range Doppler processing unit 11 with the threshold value (threshold).

Since the radar device 103 according to the second embodiment is configured as described above, target detection performance improvement is expected by increasing the duty ratio and increasing the transmission power. As an example, when the duty ratio is 100% of the maximum, the reception pulse #1 can be received in a time range from the transmission start time of the transmission pulse #2 to the transmission end time of the transmission pulse #3, and a target in a distance range corresponding to the time range is detected. Further, targets in the distance range are similarly detected for the reception pulse #2 and the reception pulse #3. In a case where two transmission frequency bands are used, a distance range corresponding to the time range from a transmission start time to a transmission end time of a single transmission pulse is a detectable target distance range, and thus, by using the three transmission frequency bands, the detectable distance range is widened, and the target can be detected at a high S/N.

Third Embodiment

Figure 7:
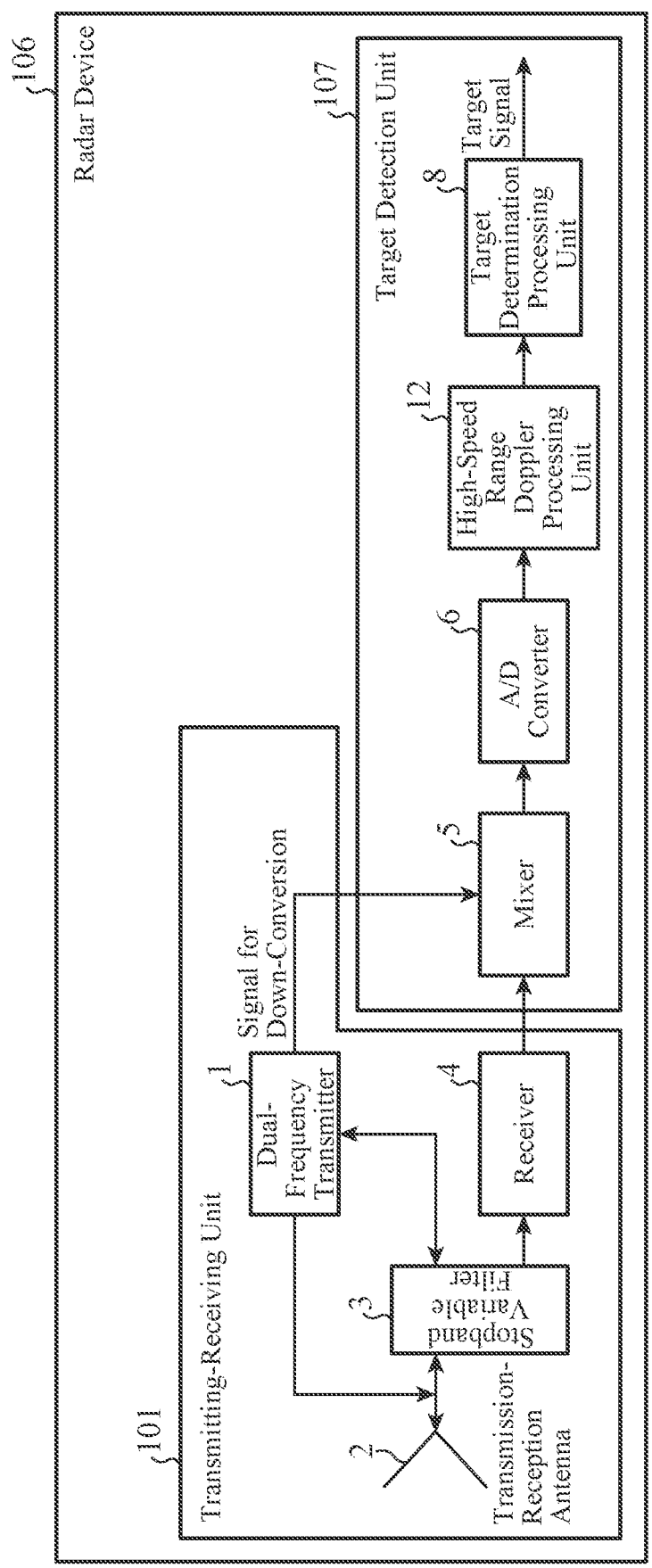
FIG. 7 is a block diagram illustrating a configuration of a radar device according to a third embodiment.

Hereinafter, a third embodiment will be described with reference to the drawings. Note that configuration components having functions similar to those described in the first embodiment are denoted by the same reference numerals, and description thereof will be omitted. FIG. 7 is a block diagram illustrating a configuration of the radar device 106 according to the third embodiment. As illustrated in FIG. 7, in the radar device 106, as compared with the radar device 100 according to the first embodiment, the target detecting unit 107 includes a high-speed range Doppler processing unit 12 instead of the range Doppler processing unit 7.

The high-speed range Doppler processing unit 12 calculates the range Doppler signal by performing chirp z-transform on the reception signal for target detection converted into a digital signal by the A/D converter 6. More specifically, in the third embodiment, the high-speed range Doppler processing unit 12 estimates a distance measurement value and a speed measurement value of a target at high speed by chirp z-transform processing on the basis of the reception signal for target detection converted into a digital signal by the A/D converter 6.

Hereinafter, operation of the radar device 106 will be described. The dual-frequency transmitter 1 alternately generates a pulse a of the transmission frequency $f_a$ and a pulse b of the transmission frequency $f_b$, and the transmission-reception antenna 2 alternately transmits the pulse a and the pulse b in a form of radio waves to the target. Then, the transmission pulse a and the transmission pulse b are reflected by the target. The transmission-reception antenna 2 acquires the reception pulse a and the reception pulse b by receiving the transmission pulse a and the transmission pulse b reflected by the target at respective different timings. The transmission-reception antenna 2 outputs the acquired reception pulse a and reception pulse b to the stopband variable filter 3 at respective different timings.

Thereafter, the radar device 106 operates similarly to the radar device 100 according to the first embodiment, and as a result, the A/D converter 6 generates the A/D converted signals $s_{ja}(t_{a,\,nh,\,ns})$ and $s_{jb}(t_{b,\,nh,\,ns})$ (h and s indicated to the right of n are each a subscript of n), and outputs the A/D converted signals to the high-speed range Doppler processing unit 12.

In the high-speed range Doppler processing unit 12, $N_d$-type speeds $v_{c,\,1} \ldots v_{c,\,Nd}$ are assumed (d indicated to the right of N is a subscript of N). The assumed speed $v_{c,\,nd}$ ($n_d=1, 2, \ldots, N_d$) is expressed by the following Expression (12). Note that, in Expression (12), $\Delta v_c$ represents an interval between adjacent speeds.

$$v_{c,n_d}=(n_d-1)\Delta v_c \tag{12}$$

Figure 8:
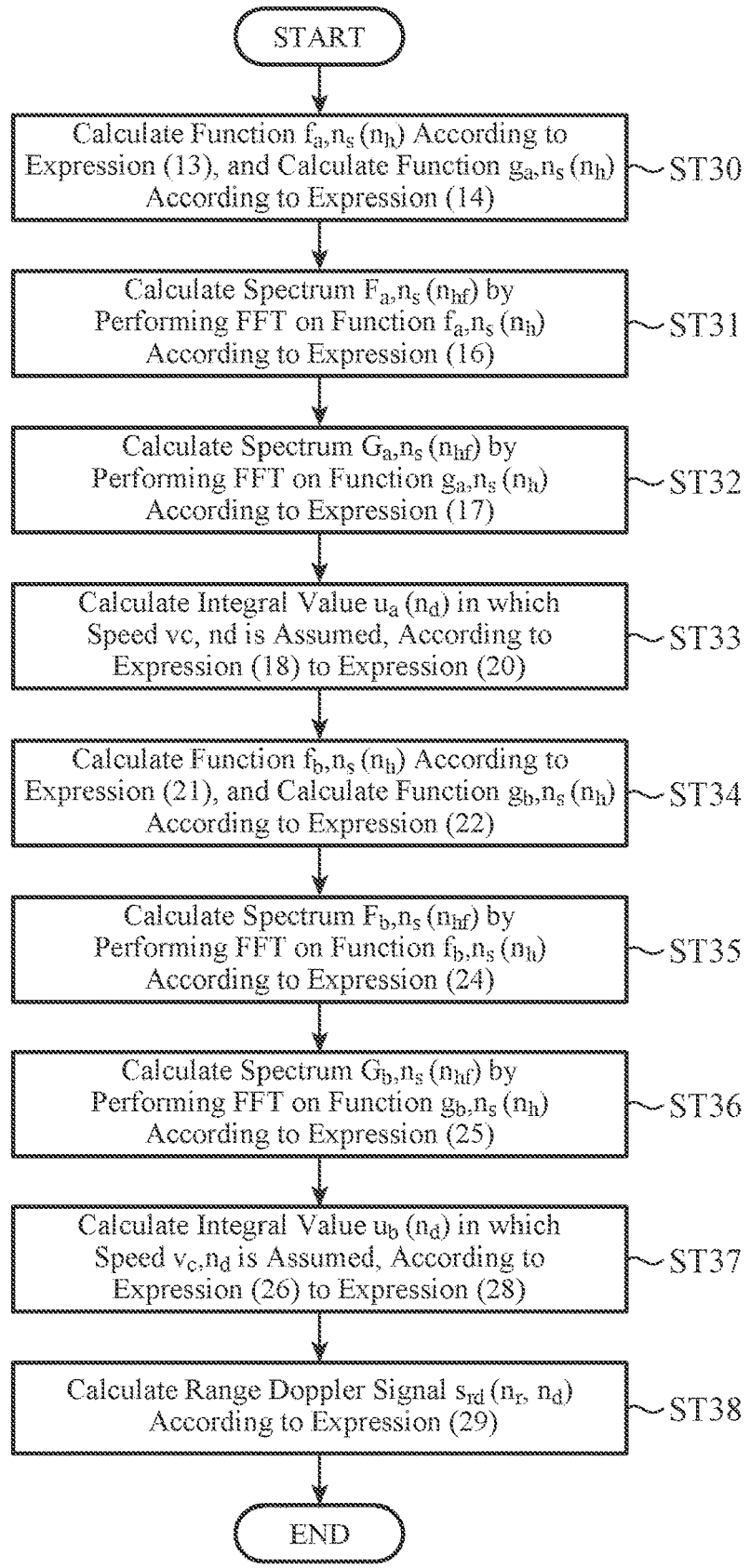
FIG. 8 is a flowchart illustrating a procedure for calculating a range Doppler signal in a high-speed range Doppler processing unit according to the third embodiment.

FIG. 8 is a flowchart illustrating a procedure for calculating the range Doppler signal $s_{rd}(n_r, n_d)$ in the high-speed range Doppler processing unit 12 that performs high-speed range Doppler processing using the chirp z-transform processing. First, the high-speed range Doppler processing unit 12 calculates a function $f_{a,\,ns}(n_h)$ according to the following Expression (13) (s indicated to the right of n is a subscript of n), and calculates the function $g_{a,\,ns}(n_h)$ according to the following Expression (14) (step ST30).

$$f_{a,n_s}(n_h) = s_{ja}(t_{a,n_h,n_s})W_a^{\frac{n_h^2}{2}} \tag{13}$$

$$g_{a,n_s}(n_h) = W_a^{-\frac{n_h^2}{2}} \tag{14}$$

$W_a$ in the Expressions (13) and (14) is expressed by the following Expression (15).

$$W_a = \exp\left(-j2\pi\frac{2\Delta v_c}{c}f_a 2T_h\right) \tag{15}$$

Next, the high-speed range Doppler processing unit 12 calculates a spectrum $F_{a,\,n_s}(n_{hf})$ by performing FFT on the function $f_{a,\,n_s}(n_h)$ according to the following Expression (16) (step ST31). Note that FFT[ ] in Expression (16) represents a function of performing FFT on the function in parentheses.

$$F_{a,n_s}(n_{hf}) = \text{FFT}[f_{a,n_s}(n_h)] \tag{16}$$

Next, the high-speed range Doppler processing unit 12 calculates a spectrum $G_{a,\,n_s}(n_{hf})$ by performing FFT on the function $g_{a,\,n_s}(n_h)$ according to the following Expression (17) (step ST32).

$$G_{a,n_s}(n_{hf}) = \text{FFT}[g_{a,n_s}(n_h)] \tag{17}$$

Next, the high-speed range Doppler processing unit 12 calculates an integral value $u_a(n_d)$ in a case of assuming the speed $v_{c,\,n_d}$, according to the following Expressions (18), (19), and (20) (step ST33) (d indicated to the right of n is a subscript of n). Note that, in Expression (18), IFFT[ ] represents a function of performing inverse fast Fourier transform (IFFT) on the function in parentheses.

$$u''_{a,n_s}(n_d) = IFFT\left[F_{a,n_s}(n_{hf}) \cdot G_{a,n_s}(n_{hf})\right] \tag{18}$$

$$u'_{a,n_s}(n_d) = W_a^{\frac{n_d^2}{2}} \cdot u''_{a,n_s}(n_d) \tag{19}$$

$$u_a(n_d) = \sum_{n_s=1}^{N_s} u'_{a,n_s}(n_d) \cdot \exp\left(-j2\pi \frac{2(n_d-1)\Delta v_c}{c} f_a(n_s-1)T_s\right) \tag{20}$$

Next, the high-speed range Doppler processing unit 12 calculates a function $f_{b,\,n_s}(n_h)$ according to the following Expression (21) and calculates the function $g_{b,\,n_s}(n_h)$ according to Expression (22) (step ST34).

$$f_{b,n_s}(n_h) = s_{jb}(t_{b,n_h,n_s})W_b^{\frac{n_h^2}{2}} \tag{21}$$

$$g_{b,n_s}(n_h) = W_b^{-\frac{n_h^2}{2}} \tag{22}$$

$W_b$ in the Expressions (21) and (22) is expressed by the following Expression (23).

$$W_b = \exp\left(-j2\pi \frac{2\Delta v_c}{c} f_b 2T_h\right) \tag{23}$$

Next, the high-speed range Doppler processing unit 12 calculates a spectrum $F_{b,\,n_s}(n_{hf})$ by performing FFT on the function $f_{b,\,n_s}(n_h)$ according to the following Expression (24) (step ST35).

$$F_{b,n_s}(n_{hf}) = \text{FFT}[f_{b,n_s}(n_h)] \tag{24}$$

Next, the high-speed range Doppler processing unit 12 calculates a spectrum $G_{b,\,n_s}(n_{hf})$ by performing FFT on the function $g_{b,\,n_s}(n_h)$ according to the following Expression (25) (step ST36).

$$G_{b,n_s}(n_{hf}) = \text{FFT}[g_{b,n_s}(n_h)] \tag{25}$$

Next, the high-speed range Doppler processing unit 12 calculates an integral value $u_b(n_d)$ in which the speed $v_{c,\,n_d}$ is assumed, according to the following Expressions (26), (27), and (28) (step ST37).

$$u''_{b,n_s}(n_d) = IFFT\left[F_{b,n_s}(n_{hf}) \cdot G_{b,n_s}(n_{hf})\right] \tag{26}$$

$$u'_{b,n_s}(n_d) = W_b^{\frac{n_d^2}{2}} \cdot u''_{b,n_s}(n_d) \tag{27}$$

$$u_b(n_d) = \sum_{n_s=1}^{N_s} u'_{b,n_s}(n_d) \cdot \exp\left(-j2\pi \frac{2(n_d-1)\Delta v_c}{c} f_b((n_s-1)T_s + T_h)\right) \tag{28}$$

Next, the high-speed range Doppler processing unit 12 calculates the range Doppler signal $s_{rd}(n_r, n_d)$ according to the following Expression (29) (step ST38).

$$s_{rd}(n_r, n_d) = u_a(n_d) + u_b(n_d) \cdot \exp\left(j2\pi(f_b - f_a)\frac{2R_{c,n_r}}{c}\right) \tag{29}$$

The high-speed range Doppler processing unit 12 according to the third embodiment calculates a range Doppler signal using the chirp z-transform as described above. Thus, the processing load can be reduced. In the first embodiment, since Expression (5) needs to be repeatedly operated for all the range bins $n_r$ and all the Doppler bins $n_d$, the processing load increases. On the other hand, in the third embodiment, the range Doppler signal is calculated without performing the iterative calculation, and the processing load can be reduced.

As described above, each of the plurality of transmission signals in the radar device 106 according to the third embodiment is a pulse wave, and the high-speed range Doppler processing unit 12 (range Doppler processing unit) calculates a range Doppler signal by performing chirp z-transform on the reception signal for target detection converted into a digital signal by the A/D converter 6.

With the above configuration, since the chirp z-transform is used, the processing load for calculating the range Doppler signal can be reduced. Therefore, the target can be suitably detected.

Each of the functions of the range Doppler processing unit 7 and the target determination processing unit 8 in the radar device 100 according to the first embodiment, each of the functions of the multi-frequency range Doppler processing unit 11 and the target determination processing unit 8 in the radar device 103 according to the second embodiment, and each of the functions of the high-speed range Doppler processing unit 12 and the target determination processing unit 8 in the radar device 106 according to the third embodiment are implemented by respective processing circuits. That is, each of the radar device 100, the radar device 103, and the radar device 106 includes a processing circuit for executing the processing of each step illustrated in FIG. 3, FIG. 6, or FIG. 8. The processing circuit may be dedicated hardware, or may be a central processing unit (CPU) that executes a program stored in a memory.

Figure 13A:
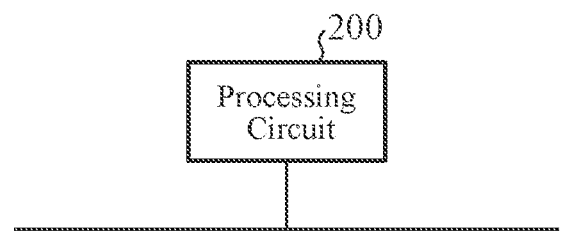
FIG. 13A is a block diagram illustrating a hardware configuration that implements functions of a transmitting-receiving unit or a target detecting unit of each embodiment.
Figure 13B:
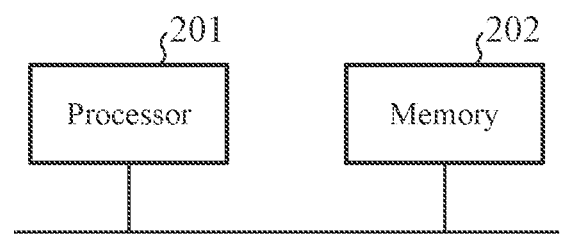
FIG. 13B is a block diagram illustrating a hardware configuration for executing software that implements the functions of the transmitting-receiving unit or the target detecting unit of each embodiment.

FIG. 13A is a block diagram illustrating a hardware configuration that implements the functions of the transmitting-receiving unit or the target detecting unit of each embodiment. FIG. 13B is a block diagram illustrating a hardware configuration for executing software that implements the functions of the transmitting-receiving unit or the target detecting unit of each embodiment.

In a case where the processing circuit is a processing circuit 200 of dedicated hardware illustrated in FIG. 13A, the processing circuit 200 corresponds to, for example, a single circuit, a composite circuit, a programmed processor, a parallel programmed processor, an application specific integrated circuit (ASIC), a field-programmable gate array (FPGA), or a combination thereof.

Each of the functions of the range Doppler processing unit 7 and the target determination processing unit 8 in the radar device 100 according to the first embodiment may be implemented by separate processing circuits, or these functions may be collectively implemented by one processing circuit. Each of the functions of the multi-frequency range Doppler processing unit 11 and the target determination processing unit 8 in the radar device 103 according to the second embodiment may be implemented by separate processing circuits, or these functions may be collectively implemented by one processing circuit. Each of the functions of the high-speed range Doppler processing unit 12 and the target determination processing unit 8 in the radar device 106 according to the third embodiment may be implemented by separate processing circuits, or these functions may be collectively implemented by one processing circuit.

In a case where the processing circuit is a processor 201 illustrated in FIG. 13B, each of the functions of the range Doppler processing unit 7 and the target determination processing unit 8 in the radar device 100 according to the first embodiment are implemented by software, firmware, or a combination of software and firmware. Each of the functions of the multi-frequency range Doppler processing unit 11 and the target determination processing unit 8 in the radar device 103 according to the second embodiment are implemented by software, firmware, or a combination of software and firmware. Each of the functions of the high-speed range Doppler processing unit 12 and the target determination processing unit 8 in the radar device 106 according to the third embodiment are implemented by software, firmware, or a combination of software and firmware.

Note that software or firmware is described as a program and stored in a memory 202.

The processor 201 reads and executes the program stored in the memory 202, thereby implementing each of the functions of the range Doppler processing unit 7 and the target determination processing unit 8 in the radar device 100 according to the first embodiment. That is, the target detecting unit 102 includes the memory 202 for storing a program that results in execution of the processing of each step illustrated in FIG. 3 when each of these functions is executed by the processor 201. The processor 201 reads and executes the program stored in the memory 202, thereby implementing each of the functions of the multi-frequency range Doppler processing unit 11 and the target determination processing unit 8 in the radar device 103 according to the second embodiment. That is, the target detecting unit 105 includes the memory 202 for storing a program that results in execution of the processing of each step illustrated in FIG. 6 when each of these functions is executed by the processor 201. Each of the functions of the high-speed range Doppler processing unit 12 and the target determination processing unit 8 in the radar device 106 according to the third embodiment are implemented. That is, the target detecting unit 107 includes the memory 202 for storing a program that results in execution of the processing of each step illustrated in FIG. 8 when each of these functions is executed by the processor 201.

These programs cause a computer to execute procedures or methods performed in the range Doppler processing unit 7 and the target determination processing unit 8 in the radar device 100 according to the first embodiment. The memory 202 may be a computer-readable storage medium storing a program for causing a computer to function as the range Doppler processing unit 7 and the target determination processing unit 8 in the radar device 100 according to the first embodiment. These programs cause a computer to execute procedures or methods performed in the multi-frequency range Doppler processing unit 11 and the target determination processing unit 8 in the radar device 103 according to the second embodiment. The memory 202 may be a computer-readable storage medium storing a program for causing a computer to function as the multi-frequency range Doppler processing unit 11 and the target determination processing unit 8 in the radar device 103 according to the second embodiment. These programs cause a computer to execute procedures or methods performed in the high-speed range Doppler processing unit 12 and the target determination processing unit 8 in the radar device 106 according to the third embodiment. The memory 202 may be a computer-readable storage medium storing a program for causing a computer to function as the high-speed range Doppler processing unit 12 and the target determination processing unit 8 in the radar device 106 according to the third embodiment.

The processor 201 corresponds to, for example, a central processing unit (CPU), a processing device, an arithmetic device, a processor, a microprocessor, a microcomputer, a digital signal processor (DSP), or the like.

The memory 202 corresponds to, for example, a nonvolatile or volatile semiconductor memory such as a random access memory (RAM), a read only memory (ROM), a flash memory, an erasable programmable read only memory (EPROM), or an electrically-EPROM (EEPROM), a magnetic disk such as a hard disk or a flexible disk, a flexible disk, an optical disk, a compact disk, a mini disk, a compact disc (CD), a digital versatile disc (DVD), or the like.

Apart of each of the functions of the range Doppler processing unit 7 and the target determination processing unit 8 in the radar device 100 according to the first embodiment may be implemented by dedicated hardware, and a part thereof may be implemented by software or firmware. A part of each of the functions of the multi-frequency range Doppler processing unit 11 and the target determination processing unit 8 in the radar device 103 according to the second embodiment may be implemented by dedicated hardware, and a part thereof may be implemented by software or firmware. A part of each of the functions of the high-speed range Doppler processing unit 12 and the target determination processing unit 8 in the radar device 106 according to the third embodiment may be implemented by dedicated hardware, and a part thereof may be implemented by software or firmware.

For example, the function of the range Doppler processing unit 7 is implemented by the processing circuit 200 as dedicated hardware. The function of the target determination processing unit 8 may be implemented by the processor 201 reading and executing a program stored in the memory 202.

As described above, the processing circuit can implement each of the above-described functions by hardware, software, firmware, or a combination thereof.

Note that free combinations of the respective embodiments, modifications of any components of the respective embodiments, or omissions of any components in the respective embodiments are possible.

INDUSTRIAL APPLICABILITY

A radar device according to the present disclosure can reduce an eclipse, and thus can be used for a technique of detecting a target on the basis of a reception signal.

REFERENCE SIGNS LIST

1: dual-frequency transmitter, 2: transmission-reception antenna, 3: stopband variable filter, 4: receiver, 5: mixer, 6: A/D converter, 7: range Doppler processing unit, 8: target determination processing unit, 9: multi-frequency transmitter, 10: multi-frequency stopband variable filter, 11: multi-frequency range Doppler processing unit, 12: high-speed range Doppler processing unit, 13: transmitter, 14: transmission antenna, 15: reception antenna, 16: pulse hit direction FFT unit, 17: pulse compression processing unit, 18: reception pulse FFT unit, 19: reference pulse generation processing unit, 20: reference pulse FFT unit, 21: multiplication processing unit, 22: IFFT processing unit, 100: radar device, 101: transmitting-receiving unit, 102: target detecting unit, 103: radar device, 104: transmitting-receiving unit, 105: target detecting unit, 106: radar device, 107: target detecting unit, 108: radar device, 109: transmitting-receiving unit, 110: target detecting unit, 200: processing circuit, 201: processor, 202: memory

The invention claimed is:

1. A radar device, comprising: transmitting-receiving circuitry to transmit a plurality of transmission signals each of which is a pulse wave having different frequency band to a target at respective different timings and acquire a reception signal by receiving a reflection signal reflected from the target; and target detecting circuitry to detect the target on a basis of the reception signal acquired by the transmitting-receiving circuitry, wherein while transmitting any one transmission signal out of the plurality of transmission signals, the transmitting-receiving circuitry acquires, as a reception signal for target detection, a reception signal of a frequency band different from a frequency band of the transmission signal, and blocks a reception signal of a same frequency band as the frequency band of the transmission signal, and the target detecting circuitry includes: a mixer to down-convert the reception signal for target detection acquired by the transmitting-receiving circuitry; an analog-to-digital converter to convert the reception signal for target detection down-converted by the mixer from an analog signal into a digital signal; range Doppler processing circuitry to calculate a range Doppler signal indicating a speed of the target and a distance to the target on a basis of the reception signal for target detection converted into the digital signal by the analog-to-digital converter; and target determination processing circuitry to determine presence or absence of the target on a basis of the range Doppler signal calculated by the range Doppler processing circuitry, and the target detecting circuitry detects the target on a basis of the reception signal for target detection acquired by the transmitting-receiving circuitry, and the range Doppler processing circuitry corrects a phase rotation within a pulse caused by movement of the target and a phase rotation determined by the distance to the target and a difference between transmission frequencies in the reception signal for target detection converted into the digital signal by the analog-to-digital converter, and calculates the range Doppler signal by performing coherent integration on a corrected reception signal for target detection.

* * * * *